US009501382B2

(12) United States Patent
Hu et al.

(10) Patent No.: US 9,501,382 B2
(45) Date of Patent: Nov. 22, 2016

(54) SYSTEMS AND METHODS OF DETECTING POWER BUGS

(71) Applicant: Purdue Research Foundation, West Lafayette, IN (US)

(72) Inventors: Yu Charlie Hu, West Lafayette, IN (US); Abhilash Jindal, West Lafayette, IN (US); Samuel Midkiff, West Lafayette, IN (US); Abhinav Pathak, San Jose, CA (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/313,890

(22) Filed: Jun. 24, 2014

(65) Prior Publication Data

US 2014/0380283 A1 Dec. 25, 2014

Related U.S. Application Data

(60) Provisional application No. 61/839,334, filed on Jun. 25, 2013.

(51) Int. Cl.
*G06F 9/44* (2006.01)
*G06F 9/45* (2006.01)
*G06F 11/36* (2006.01)
*G06F 11/34* (2006.01)

(52) U.S. Cl.
CPC .............. *G06F 11/3604* (2013.01); *G06F 8/20* (2013.01); *G06F 8/433* (2013.01); *G06F 11/3466* (2013.01)

(58) Field of Classification Search
CPC ............ G06F 8/20; G06F 8/30; G06F 8/433; G06F 11/3676; G06F 11/3466; G06F 11/3636; G06F 11/3409
See application file for complete search history.

(56) References Cited

U.S. PATENT DOCUMENTS

| 9,182,955 | B1* | 11/2015 | He ......................... G06F 8/433 |
| 2007/0300214 | A1* | 12/2007 | Chang et al. ................. 717/153 |
| 2008/0066061 | A1* | 3/2008 | Gellerich ................ G06F 8/433 717/140 |
| 2010/0016035 | A1* | 1/2010 | Pullen ........................... 455/574 |
| 2011/0107297 | A1* | 5/2011 | Chandra ................. G06F 8/433 717/110 |
| 2012/0233614 | A1* | 9/2012 | Adler .................. G06F 11/3676 718/100 |
| 2013/0110423 | A1* | 5/2013 | Zimmermann et al. ........ 702/61 |
| 2013/0268257 | A1* | 10/2013 | Hu ...................... G06F 17/5009 703/22 |

(Continued)

OTHER PUBLICATIONS

Vekris et al., "Towards Verifying Android Apps for the Absence of No-Sleep Energy Bugs", Oct. 7, 2012, Published USENIX Association Berkeley, CA, USA, pp. , pp. 34-44; <dl.acm.org/citation.cfm?id=2387872>.*

(Continued)

*Primary Examiner* — Thuy Dao
*Assistant Examiner* — Ben C Wang
(74) *Attorney, Agent, or Firm* — Purdue Research Foundation

(57) ABSTRACT

Embodiments of the present invention provide a system and methods for detecting power bugs. In one embodiment, a computer-implemented method for analyzing a computer code includes generating a control flow graph for at least a portion of the computer code at a processor. The method further includes identifying power bugs by traversing the control flow graph if the control flow graph exits without performing a function call to deactivate power to any component of a device configured to execute computer executable instructions based on the computer code after performing a function call to activate power.

16 Claims, 10 Drawing Sheets

(56) References Cited

U.S. PATENT DOCUMENTS

| | | | | |
|---|---|---|---|---|
| 2013/0283245 | A1* | 10/2013 | Black | G06F 9/44589 717/130 |
| 2014/0366147 | A1* | 12/2014 | Livshits | G06F 21/54 726/26 |
| 2015/0082284 | A1* | 3/2015 | Badea | G06F 11/3471 717/128 |
| 2015/0346007 | A1* | 12/2015 | James | G01F 9/001 702/45 |
| 2016/0210216 | A1* | 7/2016 | Monahan | G06F 11/3604 |

OTHER PUBLICATIONS

Voung et al., "RELAY: Static Race Detection on Millions of Lines of Code", 2007 ACM, ESEC/FSE'07, Sep. 3-7, 2007, Croatia, pp. , pp. 1-10; <http://dl.acm.org/results.cfm?h=1&cfid=615012636&cftoken=15389382>.*

Pathak et al., "Fine Grained Energy Accounting on Smartphones with Eprof", 2012 ACM, EuroSys'12, Apr. 10-13, 2012, Bern, Switzerland, pp. 1-14; <http://dl.acm.org/results.cfm?h=1&cfid=525099322&cftoken=43339598>.*

Pathak et al., "What is keeping my phone awake? Characterizing and Detecting No-Sleep Energy Bugs in Smartphone Apps", ACM, MobiSys'12, Jun. 2012, pp. 1-14; <http://dl.acm.org/citation.cfm?id=2307661&CFID=671649437&CFTOKEN=60449190>.*

Abbasi et al., "A Framework for Detecting Energy Bugs in Smartphones", IEEE, Oct. 2015, pp. 1-3; <http://ieeexplore.ieee.org/stamp/stamp.jsp?tp=&arnumber=7333297>.*

Danilo Dominguez, "Analyzing Android Applications for Specifications and Bugs", Aug. 2013, Rochester Institute of Technology, pp. 1-71; <http://scholarworks.rit.edu/cgi/viewcontent.cgi?article=6525&context=theses>.*

* cited by examiner

SYSTEMS AND METHODS OF DETECTING POWER BUGS

This application claims the benefit of U.S. Provisional Application No. 61/839,334, filed on Jun. 25, 2013, which application is hereby incorporated herein by reference.

GOVERNMENT RIGHTS

This invention was made with government support under CCF-0916901 awarded by the National Science Foundation. The government has certain rights in the invention.

TECHNICAL FIELD

The present invention relates generally to power bugs, and more particularly to a system and method for detecting power bugs.

BACKGROUND

Smartphones have surpassed desktop machines in sales in 2011 to become the most prevalent computing platforms. To enrich the user experience, modern day smartphones come with a host of hardware I/O components embedded in them. The list of components broadly fall into two categories: traditional components such as CPU, WiFi NIC, 3G radio, memory, screen and storage that are also found in desktop and laptop machines, and exotic components such as GPS, camera and various sensors. And they differ from their desktop/laptop counterparts in that power consumed by individual I/O components is often comparable to, or higher than, the power consumed by the CPU.

This, along with the fact that smartphones have limited battery life, dictates that energy has become the most critical resource of smartphones. Preserving this crucial resource has driven smart-phone OSes to resort to a paradigm shift in component power management. On desktop machines, where the CPU accounts for a majority of the energy consumption, the default energy management policy is that the CPU stays on (or runs at a high frequency) unless an extended period of low load has been observed. The policy is consistent with the historical notion that energy management is a second class citizen since machines are plugged into a power source. Smart phones, in sharp contrast, make power management policy a first class citizen. In fact, the power management policy on smartphones has gone to the other extreme: the default power management policy is that every component, including the CPU, stays off or in an idle state, unless the app explicitly instructs the OS to keep it on.

In particular, all smartphone OSes, e.g., Android, IOS, and Windows Mobile, employ an aggressive sleeping policy which put the components of the phone to sleep, i.e., puts them into a suspended state immediately following a brief period of user inactivity. In the suspended state, the smartphone as a whole draws near zero power, since nearly all the components, including CPU, are put to sleep. Such a sleeping policy is largely responsible for prolonged smartphone standby times—smartphones can last dozens of hours when suspended.

The aggressive sleeping policy, however, severely impacts smartphone apps, since an app may be performing critical tasks by intermittently interacting with the external world using various sensors. For example, an app syncing with a remote server over the network may appear to perform no activity when waiting for the server to send its reply, and the system may be put to sleep by the aggressive sleeping policy, leaving the remote server with a view of lost connectivity.

To avoid such disruptions due to the aggressive sleeping policy, smartphone OSes provide a set of mechanisms for app developers to explicitly notify the OS of their intention to continue using each component. In particular, the OS exports explicit power management handles and APIs, typically in the form of power wakelocks and acquire and release APIs, for use by the app developer to specify when a particular component needs to stay on, or awake, until it is explicitly released from duty.

Explicit management of smartphone components by app developers has presented to the app developer a profound paradigm shift in smartphone programming that we call power-encumbered programming. This new programming paradigm places a significant burden on developers to explicitly manipulate the power control APIs (e.g., the below section relating to no sleep code path details one such example of the burden placed on developer due to power encumbrance). This manipulation is required to ensure the correct operation of the apps. Consequently, power-encumbered programming unavoidably gives rise to a new class of software energy bugs on smartphones, called no-sleep bugs. No-sleep bugs are defined as energy bugs resulting from mishandling power control APIs in an app or framework, resulting in the smartphone components staying on for an unnecessarily long period of time. No-sleep bugs form one important category of the family of smartphone energy bugs which are defined in as errors in the smartphone system (an app or the framework, the OS, or the hardware) that cause an unexpectedly high energy consumption by the system as a whole.

Discussions of energy bugs on numerous Internet forums have narrowed the causes to mishandling of power control APIs by apps and the framework on smartphones OSes, including Android, IOS, and Windows Mobile. Our previously published recent survey ("A. Pathak, Y. C. Hu, and M. Zhang, "Bootstrapping energy debugging for smartphones: A first look at energy bugs in mobile devices," in Proc. of Hotnets, 2011) found that 70% of all energy problems in apps and frameworks reported by mobile users were due to no-sleep energy bugs. These and other types of energy bugs have caused a great deal of user frustration. Despite their severity, i.e., high battery drain, to the best of our knowledge there has been no study of any kind of smart phone energy bugs, much less no-sleep energy bugs. Research works exists in traditional software bugs relating to concurrency bugs in concurrent programs (S. Lu, S. Park, E. Seo, and Y. Zhou, "Learning from mistakes—a comprehensive study on real world concurrency bug characteristics," in ASPLOS, 2008).

SUMMARY

In accordance with an embodiment of the present invention, a computer-implemented method for analyzing a computer code includes generating a control flow graph for at least a portion of the computer code at a processor. The method further includes identifying power bugs by traversing the control flow graph if the control flow graph exits without performing a function call to deactivate power to any component of a device configured to execute computer executable instructions based on the computer code after performing a function call to activate power.

In accordance with an embodiment of the present invention, a computing device comprises a processor configured to execute a debugging tool. The debugging tool is configured to generate a control flow graph for at least a portion of a computer code. The debugging tool is further configured to identify power bugs by detecting if the control flow graph exits without performing a function call for deactivating power to any component of a device configured to execute computer executable instructions based on the computer code by traversing the control flow graph after performing a function call to activate power.

In accordance with an embodiment of the present invention, a non-transitory storage medium comprises a debugging tool. The debugging tool is configured to generate a control flow graph for at least a portion of a computer code. The debugging tool is further configured to identify power bugs by detecting if the control flow graph exits without performing a function call for deactivating power to any component of a device configured to execute computer executable instructions based on the computer code by traversing the control flow graph after performing a function call to activate power.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
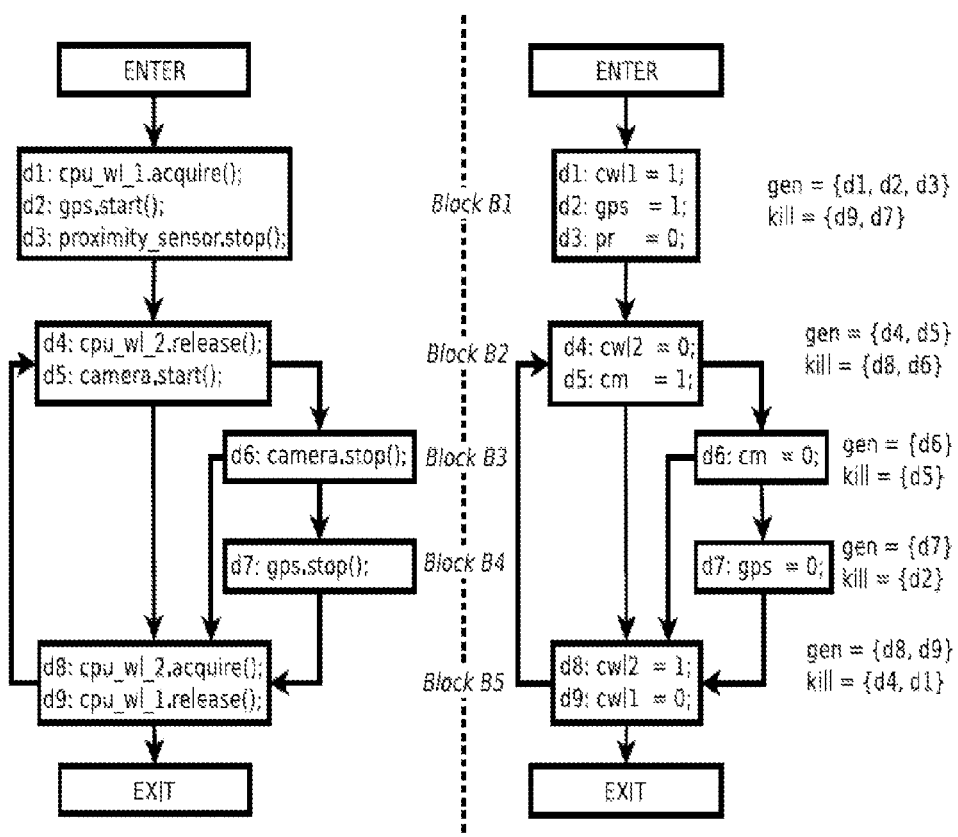
FIG. 1 shows an example of a dataflow graph illustrating a transformation of a no-sleep code path into reaching definition dataflow problem and the result IN and OUT sets.

The various embodiments of the present invention are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. For example, although embodiments of the present invention will be described using smartphone as an example, embodiments of the present invention are applicable to any device, and in particular to any device that is power constrained, e.g., running on battery.

Despite their immense popularity in recent years, smartphones are and will remain severely limited by their battery life. Preserving this critical resource has driven smartphone OSes to undergo a paradigm shift in power management: by default every component, including the CPU, stays off or in a suspended state, unless the app explicitly instructs the OS to keep it on. Such a policy encumbers app developers to explicitly juggle power control APIs exported by the OS to keep the components on, during their active use by the app and off otherwise. The resulting power-encumbered programming unavoidably gives rise to a new class of software energy bugs on smartphones called no-sleep bugs, which arise from mishandling power control APIs by apps or the framework and result in significant and unexpected battery drainage.

A comprehensive treatment of energy bugs on smartphones will require a good understanding of real world energy bug characteristics, learned from common mistakes programmers make in writing smartphone apps, to lead to effective debugging techniques. Such treatment also requires developing multi-faceted approaches to eliminating energy bugs, including avoiding energy bugs during app development (e.g., by providing better programming language support for power management) and compile and runtime detection.

Embodiments of the present invention describe the first advances towards understanding and automatically detecting software energy bugs. In one embodiment, we present the first comprehensive study of real world no-sleep energy bug characteristics. In various embodiments, we propose the first automatic solution to detect these bugs based on the classic reaching definitions dataflow analysis algorithm. Additionally, we provide experimental data showing that our tool accurately detected all 12 known instances of no-sleep bugs and found 30 new bugs in the 86 apps examined.

(1) The first characterization study of no-sleep energy bugs in smartphone apps: We present the first comprehensive real world no-sleep energy bug characterization study. Our study is based on no-sleep energy bugs in real world apps and the Android framework (in this application, the term framework is used to refer to both the services in and the apps that are bundled with the Android framework) including popular apps (e.g., Facebook) and built-in (i.e., shipped with) apps and services (e.g., the Android email app). The bugs are collected by crawling Internet mobile forums, bug repositories, commit logs of open source Android apps and by running our no-sleep bug detector developed in this paper. For each bug, we carefully examine its reported symptoms, corresponding source code and related patches (when available), and developer's discussions (when available), or the analysis performed by our bug detector. Our study reveals a taxonomy of three major causes of no-sleep energy bugs, which provide useful guidelines and hints to designing effective detection techniques. Our study also confirms the significant burden power-encumbered programming places on app developers. For example, making a single outgoing or incoming phone call in Android involves about 40 invocations of power control APIs in the Dialer app and the framework's Radio Interface Layer services to dynamically manage the power control of the CPU, screen, and other sensors!

(2) The first solution to automatically detect no-sleep energy bugs: We make the key observation that power control APIs are explicitly embedded in the app source code by the app developers, and two out of the three causes for no-sleep energy bugs from our characterization study are because a turn-on API call is missing a matching turn-off API call before the end of the program execution.

Accordingly, in various embodiments, a compile-time solution based on the reaching definitions dataflow analysis problem is proposed to automatically infer the possibility of a no-sleep bug in a given app. Our solution detects no-sleep bugs in single-threaded and multi-threaded apps, as well as event-based apps which have multiple entry points Like all static analysis based tools, our detection tool can suffer false positives but has the tremendous advantage of no runtime overhead and no false negatives (to the best of our abilities of establishing the ground truth).

In further embodiments of the present invention, the complete implementation of our static analysis detection tool for apps written for Android is presented. The tool is capable of running directly on the app installers (.apk files) and hence source code is not required. Our implementation handles the specifics of event-driven mobile programming and of the Java language such as runtime null pointer exceptions and object references.

(3) Detecting new no-sleep bugs in android apps and framework: We have run our no-sleep bug detection tool on 86 Android apps and the framework collected from the Android market. Experimental evaluation shows that our tool accurately detected all reported instances of no-sleep bugs, as well as 30 instances of new previously unreported no-sleep bugs. These include no-sleep bugs in many popular apps, e.g., the default Android Email app. Our no-sleep bug detection incurred false positives in 13 out of the 55 apps it reported to contain a bug.

In this section, we first describe the energy management APIs and their semantics that are exposed to the developers in the Android smartphone OS, and discuss the burden they impose on the app developers. We first discuss programming APIs for traditional components (e.g., screen, CPU) and then for exotic components (e.g., GPS, Camera). We also discuss the issues arising from the event based programming model of smartphone apps. We then introduce the prominent class of energy bugs: no-sleep bugs.

The Android framework exports wakelock functionality through PowerManager.Wakelock class, with 4 different options and associated APIs for managing several traditional components: CPU, screen, and the keyboard backlight. A wakelock is an instance (object in Java) of the wakelock class, instantiated using one of four options, and each option has a different effect on the hardware component, as summarized in Table 1. For example, option FULL_WAKE_LOCK instantiates a lock that when acquired both keeps the CPU and screen on at full brightness and turns on the keyboard backlight.

Listing 1 illustrates a basic wakelock usage: how to ensure that the CPU does not sleep during some critical phase. The app declares a wakelock (pm is an instance of PowerManager) and then acquires it, which instructs the OS not to put the CPU to sleep, irrespective of user activity, since it intends to perform some critical task. Once the critical task (in this case a remote network sync net_sync ( )) is completed the app releases the wakelock, indicating to the OS that CPU can now sleep according to its sleeping policies.

Semantics: The above simple usage of a wakelock is just like a conventional mutual exclusion lock, i.e., an app explicitly acquires and releases it to instruct the OS to switch the component on and off, respectively. Like an object a wakelock can be shared among several threads of a process. The semantics of wakelocks, however, are quite different from those of conventional mutual exclusion locks.

First, as illustrated in Table 1, a single wakelock (instantiated with one of the four options) controls one or more components. Second, the power control effect of a single wakelock depends on the configuration of that wakelock: a wakelock can be configured to be reference counted. In an almost peculiar sense, it is more like a condition variable when configured not to be reference counted, and a semaphore when configured to be reference counted.

We first consider non-reference counted wakelocks. An acquire( ) on a released or fresh instance of wakelock wakes up the corresponding component (the ACQUIRE_CAUSES_WAKEUP flag wakes up the screen), or keeps the component awake if it is already so. In other words, an acquire( ) called on an already acquired wakelock is treated as a nop. Similarly, a release( ) called on an acquired wakelock sets the component free to sleep as far as the perspective of this wakelock is concerned, irrespective of the number of times an acquire( ) has been called on the lock. In this sense, a non-reference counted wakelock is like a condition variable.

TABLE 1

Summary of power operation exported by Android APIs.

| Component lock/manager name (API to start/stop) | Component(s) | Battery Drain up to (%/hr) | Comments |
|---|---|---|---|
| Traditional Components | | | |
| PARTIAL_WAKE_LOCK (acquire/release) | CPU | 5% | CPU runs despite any timers |
| SCREEN_DIM_WAKE_LOCK (acquire/release) | CPU and Screen (DIM) | 12% | No illumination if shutdown, else |
| SCREEN_BRIGHT_WAKE_LOCK (acquire/release) | CPU and Screen (bright) | 25% | illuminates till lock release (Flag |
| FULL_WAKE_LOCK (acquire/release) | CPU, Screen (bright) and Keyboard backlight | 25% | ACQUIRE_CAUSES_WAKEUP forces illumination in all cases) |

TABLE 1-continued

Summary of power operation exported by Android APIs.

| Component lock/manager name (API to start/stop) | Component(s) | Battery Drain up to (%/hr) | Comments |
|---|---|---|---|
| Exotic Components | | | |
| PROXIMITY_SCREEN_OFF_WAKE_LOCK (acquire/release) | Screen, Proximity Sensor | 25% | Screen shuts if sensor activates |
| LocationManager (requestLocationUpdate/removeUpdates) | GPS | 15% | Tracks user location |
| SensorManager (registerListener/unregisterListener) | Accelerometer, Gyro, Proximity Magnetic Field, etc. | 10% | Sensormanager class controls various sensors on phone |
| MediaRecorder (start/stop) | Mic/Camera (for video) | 20% | Usually stores media on sdcard |
| Camera (startPreview/stopPreview) | Camera (for still pictures) | 20% | One app at a time registers camera |

Listing 1: An example power wakelock usage.

```
1  PowerManager.WakeLock wl = pm.newWakeLock(PowerManager.
      PARTIAL_WAKE_LOCK);
2  wl.acquire( );     //CPU should not go to sleep
3  net_sync( );       //Perform critical task here
4  wl.release( );     //CPU is free to sleep
```

In contrast, reference counted wakelocks are like semaphores. Each acquire( ) of a wakelock increments the internal counter associated with the (instance of) wakelock, and a release( ) decrements the internal counter. It only lets the component sleep (from the perspective of this wakelock) if the internal counter value reaches 0. A release is a nop, although newer Android APIs throw an exception when release( ) is called on an unacquired wakelock. Hence, a release is usually called after testing if the lock is currently held (using API wakelock.isHeld( )) in other cases.

To make matters even more complicated, an acquire( ) can also be called with a timer, which instructs the system to release it automatically once the timeout interval expires.

Third, the above power control semantics are from the perspective of one wakelock. Unlike traditional mutual exclusion locks, different wakelocks (even instantiated with different options) on the same component can be held by multiple entities (e.g., processes and threads) in the system at the same time. Even a single entity may hold multiple (instances of) wakelocks on the same component. The power control effect on a component must take into account the state of all wakelocks. The component is switched on when the first wakelock is held. Only when all the wakelocks from all the entities for the component are released, taking into account the reference counting semantics for each, can the component go to sleep, subject to higher level sleeping policies (administered by framework processes), e.g., sleep after 5 seconds of user inactivity.

This demonstrates the new programming burden inflicted on app developers: power management is no longer just a transparent OS or driver task. Rather, the developers now needs to perform explicit power management in the app layer.

In addition to traditional components, modern smart-phones come with several "exotic" components embedded in them. These include GPS, camera, and several sensors such as an accelerometer, proximity sensor, and gyroscope. Some of these components are the biggest energy consumers in smartphones, e.g., GPS and camera, and drain the battery at a high rate.

Unlike some of the traditional components, e.g., WiFi NIC, the exotic components are used in an explicit on-off fashion. For example, the GPS is explicitly turned on, using the OS exported API, to acquire the smartphone location and in this state it consumes battery at a high rate. Once the location is determined, the component is explicitly turned off, triggering the component to return to a low power state.

Like wakelocks, the explicit power management of exotic components places a significant programming burden on app developers. The inventors of this application have identified that an incorrect or inefficient use of these APIs can easily lead to poor utilization of these components, wasting significant battery energy.

Semantics: Table 1 lists the APIs exported by Android for accessing the exotic components. Their semantics of power control of these components is similar to the plain wakelocks described above, i.e., no reference counting or timer-based release.

In summary, developers are burdened with explicitly manipulating power control APIs for both traditional and exotic smart-phone components to ensure the correct operations of the apps. In this present application, we call this new smartphone programming paradigm power-encumbered programming.

The complexity of power-encumbered programming is exacerbated by the event-based nature of smartphone apps. Compared to programming in desktop/server environments, smartphone programming is event-oriented because of the inherent interactive nature of phone apps. A typical user-facing smartphone app is written as a set of event handlers with events being user or external activities. The developer needs to keep track of each possible event and when it may be triggered, and manipulate the wakelocks accordingly.

We illustrate how the level of complexity introduced by power-encumbered programming is exacerbated by event-based programming through a concrete example from the Dialer app that comes with the Android framework.

The Dialer app implements the dialing functionality of the phone. The app is triggered when the user receives an incoming call or when the user clicks the phone icon to make an outgoing call. To implement its functionality, the app explicitly maintains three wakelocks: FULL_WAKE_L-

OCK for keeping the screen on (e.g., in situations like when the user is dialing the numbers to call), PARTIAL_WAKE_LOCK for keeping the CPU on (e.g., in case of an incoming call when the phone is switched off), and PROXIMITY_SCREEN_OFF_WAKE_LOCK which switches the proximity sensor on and off (to detect user's proximity to the phone).

To manage the three wakelocks, the app explicitly maintains a state machine where the states represent the lock behavior, i.e., which lock needs to be acquired and which needs to be released, and the "condition" of the phone represents the state transitions. The conditions are diverse and include events such as (a) if the phone gets a call, (b) if the phone is pressed against the user's ear in which case the proximity sensor triggers the screen to go off, (c) if the call ends, (d) if a wired or bluetooth headset is plugged in (e.g., in the middle of a call), (e) if the phone speaker is turned on, (f) if the phone slider is opened in between calls, and (g) if the user clicked home button in the middle of a call. For each of these triggering events, the phone changes the state of wakelock state machine, acquiring one and releasing another.

In addition to wakelocks in the Dialer app, the Radio Interface Layer (RIL) in Android maintains an additional 5 wakelocks to handle incoming and outgoing calls. Using explicit component access tracing through an instrumented Android framework running on a Google Nexus One handset, we observed that performing a single outgoing or incoming call in Android resulted in 30-40 distinct instances of wakelock acquires and releases.

Therefore, the burden of explicit component power manipulation from power-encumbered programming, combined with the complexity of handling events in the app behavior, can easily overwhelm developers and lead to programming mistakes in manipulating the power control APIs. Incorrect or inefficient usage of such APIs can lead to an unexpected drain of the phone battery, known as no-sleep bugs.

A "no-sleep bug" is a condition where at least one component of the phone is woken up and is not put to sleep due to a mistake in manipulating power control APIs in an app. The component that is woken up continues to drain the battery for a prolonged period of time, resulting in severe and unexpected battery drain. Typically the battery drain continues until the app is forcefully killed or the system is rebooted.

No-sleep bugs form one of the most important categories of software energy bugs in smartphone apps. Unlike regular software bugs in apps, energy bugs do not lead to an app crash or OS blue screen of death. An app hit by an energy bug continues to provide the intended functionality, with a single difference: the phone suffers a severe, unexpected battery drain. The severity of the energy drain due to the bug depends on the component that is not put to sleep. As shown in Table 1, for each of the 3 components (GPS, Screen with full or low brightness and camera), the impact of a no-sleep bug can be severe with the battery draining at a rate of 10-25% every hour without any user interaction.

For other components, e.g., the CPU and proximity sensor, the battery drains at a relatively low rate—upto 5% every hour. When a CPU wakelock (PARTIAL_WAKE_LOCK) is held, it prevents the CPU from 'freezing', a state where it would consume zero power (IDLE state). In a wakelock held state, the CPU draws minimal power (depending on the CPU specifications of the handset). However, as the CPU remains on, other activities continue to run, e.g., WiFi NIC chatters, background periodic OS processes, hardware interrupts handling by OS, etc. These activities together consume, as measured on Google Nexus One, about 5% of the battery every hour. Any additional user activity is not accounted for in this. As a result, over a long period of time, say 12 hours, an only-CPU wakelock bug can drain about 50-60% of the battery without any user interaction or performing necessary activities.

To characterize the root cause of no-sleep bugs observed in current mobile apps, we collected no-sleep bugs in smartphone apps in four ways.

(a) Mobile forums: We crawled 4 popular mobile Internet forums: one general forum with discussions covering all mobile devices and OSes, and three OS/company specific mobile forums. In total we crawled 1.2M posts, from which we filtered out posts related to no-sleep bugs in smartphone apps. For each app reported by the user to contain a no-sleep bug, we downloaded the binary installers of the version of the app that was reported to contain the bug and the first version which had the problem solved. We then decompiled the app from binary installers to Java source code using ded[6] ("Decompiling Android Applications"). For apps that were successfully decompiled (e.g., FaceBook), we studied the root cause of no-sleep bugs.

(b) Bug lists: We crawled mobile bug repositories of open source mobile frameworks like Android and Maemo. We extracted bugs reported with no-sleep conditions and extracted the source code (open source) of the versions that actually contained the bugs (e.g., no-sleep bug in Android SIP Service) and its patch (if available).

(c) Open source code repositories: We scraped the commit logs of open-source Android apps hosted on online code repositories like github. We extracted the commit logs of no-sleep bug fixes and downloaded the versions both before and after the fix.

(d) Running our no-sleep bug detection tool: Finally, we ran our solution of automatically detecting no-sleep bugs developed in this paper on 86 Android apps and the stock framework and discovered 42 apps with no-sleep code-paths as will be described in detail below (labeled with "*" in Table 2). These apps are used in the characterization study presented below.

Using the bug-collection methodology described above, a case-study of no-sleep bugs observed in smartphone apps is presented using embodiments of the present invention. We characterize the root cause and impact of the bugs. Table 2 gives a summary of the three general categories of no-sleep bugs we have identified and their impact. Drain time shows the amount of time it will take to drain a fully charged battery under typical usage. Without the bugs, it takes about 15 hours to drain a fully charged battery. The bug references in Table 2 refer to both the bug fix commit logs and user complaints about specific apps on Android bug repositories, all of which indicate the real impact and user frustration caused by the no-sleep bugs. The first two categories, No-Sleep Code Paths and No-Sleep Race Condition, exhibit typical symptoms of no-sleep bugs where a component is not put to sleep at all, whereas the third category, no-sleep dilation, represents the scenario where a component was held on much longer than the programmer's intention (on the order of hours). An in-depth analysis of these three categories of no-sleep bugs will be described below.

The root cause for most of the observed no-sleep bugs in a single threaded activity was the existence of a code path in the app that wakes up a component, e.g., by acquiring the wakelock for the component, but does not put the component back to sleep, e.g., there is no release of the lock. This category captures a majority of the no-sleep bugs we have observed in our bug collection. We observed three causes for the existence of a code path where the component was switched on but not put to sleep.

The first cause is that the programmer simply forgot to release the wakelock throughout the code, or the programmer released the lock in the if branch of a condition but not in the else branch. Although it seems like a simple mistake, this does happen in real apps. For example, a version of the Agenda widget contained such a no-sleep bug.

output is printed, and the code exits the try catch block. Consequently, the code-path followed does not release the wakelock, keeping the CPU on indefinitely. To fix this problem, the wakelock is released in the finally block so that it is always executed.

A large number of no-sleep bugs are caused by this second reason. These include popular apps such as FaceBook, Agenda widget (another version), MyTrack (no sleep of GPS), BabbleSink, CommonsWare and apps, as well as

TABLE 2

No-sleep bug case study. Entries with (F) represent bugs in the Android framework, and with (*) represent new bugs found by our technique.

| App | Description | Bug Description | Drain Time |
|---|---|---|---|
| No-Sleep Code Paths | | | |
| Agenda Widget | Popular Android widget managing news/calendar | Two bugs were reported in different versions (a) not all branches release wakelocks in AlarmService; (b) programmer forgot to call wakelock release after acquiring it. | 9 hrs |
| FaceBook | The default FaceBook App v 1 . . . 3 . . . 0 | facebook.katana.HomeActivity, the central Activity, acquires wakelock to run FaceBookService. Not all possible branches in the service release wakelocks. | 9 hrs |
| k9mail | One of the most popular email client for Android | Per-thread wakelock maintained. Wakelock acquired when IMAP DONE was sent, but was not released in MessagingControllerPushReceiver during IDLE stat | 9 hrs |
| CheckinMaps | Visual stories on maps | GPS remains on, even when user closes the app (calling the onPause( ) handler). | 5 hrs |
| (*)MyTrack | Track User Path online | GPS remains on, even after user navigates away from the app draining battery. | 5 hrs |
| BabbleSink | Find phone's location | A Null Pointer Exception causes the thread to exit without releasing wakelock. | 9 hrs |
| CommonsWare | Android Training Book | Wakelock released without finalize. | 9 hrs |
| Sip Service (F) | Std. voice protocol implementation in Android | A Sip handler (object) was deleted which had wakelocks acquired before releasing the wakelock. The deleted handlers cannot perform release( ) to release the wakelocks. | 9 hrs |
| Telephony (F) | Telephony Handler: RIL service in Android code | Android telephony does not release the partial wakelock right away if there is an error in sending the RIL request, preventing the phone to go in power collapse draining battery. | 9 hrs |
| (*)Android Exchange (F) | The default email app in Android framework | During background syncing of mailboxes in an exchange account, the app acquires wakelock and does not release in all failure conditions, specifically in IOExceptions. | 9 hrs |
| WifiService (F) | Android WiFi Handlers | CPU does not go to sleep during a message removal and wakelock was held forever. | 9 hrs |
| PowerManager(F) | PowerService Android | Two instances of wakelocks are not released inPowerManagerService in Android. | 9 hrs |
| LocationListener (F) | GPS handling library in Android framework | A deadlock in LocationManagerService for releasing wakelocks after client notifications have been received prevented the release of the wakelocks draining battery. | 9 hrs |
| No-Sleep Race Condition | | | |
| (*)Android Email app (F) | Default Android email app performing sync | Race condition between email synchronizing thread and the main thread which kills the synchronizing thread resulted in a shared wakelock to remain in acquired state after exit. | 9 hrs |
| No-Sleep Dilation | | | |
| MyTrack | Track User Path online | Wakelock acquired and released much before and after the required functionality in app. | 9 hrs |
| GoogleBackup (F) | Cloud backup | Wakelock reported to be held for a long duration of time (up to an hour) in poor network. | 11 hrs |
| GPS Driver (F) | Android GPS handler | Wakelocks are being held for longer than needed in low level GPS driver code. | 15 hrs |
| Google Maps | Android Google maps | App was reported to hold wakelock for several hours even when it was not used. | 10 hrs |

The second cause is that the programmer did put code that releases the component wakelock on many code paths, but the code took an unanticipated code path during execution along which the component was not put to sleep. Listing 2 shows a code-snippet that represents a typical template of a no-sleep bug where an app takes a different, somewhat unanticipated code path after waking up a component and therefore does not put it back to sleep. As in Listing 1, the critical task in the app, net_sync( ), is protected by acquiring and releasing the CPU wakelock instructing the CPU not to sleep during the remote syncing phase. However, routine net_sync( ) may throw exceptions, a Java language mechanism for notifying apps of some failure conditions, such as a connect to a remote end host failed, a string could not be parsed to integer, or a specific file to be opened does not exist. A thrown exception is explicitly caught by the try's catch block which simply prints the exception for debugging purposes. Now the no-sleep bug can manifest itself in the following code path. First the try block executes and acquires the wakelock. Next a call is issued to the critical task, net_sync( ). If an exception is raised inside net_sync( ), the control directly jumps to the catch block, the debug services that come with the Android framework, such as Android Telephony, Android Exchange, and WifiService. For example, in SIP service, the wakelock was not released since the objects containing the wakelocks were deleted and so the lock handlers were deleted along with them.

The third cause for a no-sleep code path is that a higher level condition (like an app level deadlock) prevented the execution from reaching the point where the wakelock was to be released. This is likely to happen in smartphone programming because event-based programming of smartphones can lead to many possible code branches (as in the example of the Android Email app) that makes it difficult for the programmer to anticipate all the possible code paths and keep track of the wakelock state. LocationListener in the Android framework contained such a no-sleep bug. The developer did release the wakelock, however, a higher level app deadlock prevented the code from entering the release phase of the app.

Further, the most common pattern of no-sleep code-path bug is a result of the fact that developers do not properly understand the life-cycle of Android processes. In Android, an app activity once started is always alive. When the user exits any app, Android saves the state of the app and passes it back to the app if the user returns to it. The app is only completely killed when the phone is critically low on RAM or when the app kills itself. This methodology is used to reduce the startup time of the app and to maintain its state.

This means that the app may not actually be destroyed for very long periods of time. But many app developers only release the wakelock in the on Destroy( ) call-back, instead of in onPause( ).onDestroy( ) is called when the app component is about to be destroyed. As a result, once an app with this bug is started, the phone will only sleep when it is running critically low on memory (which may take a long period of time).

Listing 2: No-sleep bug: different code paths.

```
1    try{
2        wl.acquire( );        //CPU should not sleep
3        net_sync( );          //Throws Exception(s)
4        wl.release( );        //CPU is free to sleep
5    } catch(Exception e) {
6        System.out.println(e); //Print the error
7    } finally {
8    } //End try-catch block
```

Listing 3: Wakelock Complexity

```
1    @Override protected void finalize( ){
2        /**
3         * It is understood that This finializer is not
4         * guaranteed to be called and the release lock
5         * call is here just in case there is some path
6         * that doesn't call onDisconnect and or
7         * onConnectedInOrOut.
8         */
9        if (mPartialWakeLock.isHeld( )) {
10           Log.e(LOG_TAG, "[CdmaConn] UNEXPECTED;
             mPartialWakeLock
                is held when finalizing.");
11       }
12       releaseWakeLock( );
13   }
```

Manually tracking all possible code paths for wakelock acquire/release appears to be a daunting task for app developers. Listing 3 shows an example of the complexity involved in power-encumbered programming. This is a code-snippet from the Android framework's class CdmaConnection. This class uses a PARTIAL_WAKE_LOCK for managing the connection and releases the wakelock when the connection is disconnected. However, there are many different possible program paths arising from different patterns of user interactions, hardware states dependent on the external environment, etc. The developer included releaseWakeLock in finalize as an additional safety measure, even though finalize is not guaranteed to be called. This example shows the need for an automated tool that can aid developers in checking all possible program paths for no-sleep bugs.

The second category of no-sleep bugs we observed was cause by race conditions in multi-threaded apps. Specifically, we observed that the power management of a particular component was carried out (i.e., switched on and off) by different threads in the app. In the common case, one thread switches the component on, and sometime later another thread switches the component off, resulting in the normal behavior of component utilization. However, in a corner case condition, it can happen that the thread that switches on the component gets scheduled to run after the thread that switches the component off, resulting in a no-sleep bug with the component left on. Effectively there is a race condition between the manipulations of the wakelock by the two threads.

Listing 4 shows a code snippet of a no-sleep bug caused by a race condition. Main_Thread runs first, acquiring a wakelock (waking up a component, e.g., the CPU), and then fires Worker_Thread which periodically executes a critical task, e.g., syncing stock up-dates. After every synch Worker_Thread gives up the lock, sleeps for 3 minutes (allowing the CPU to sleep), and re-acquires the lock after waking up. This process is repeated in an infinite loop until Worker_Thread is notified by Main_Thread using the mKill flag to break out of the loop. To initiate the termination of the app, Main_Thread sets the mKill flag, and calls the API stop to signal Worker_Thread to initiate the halt which wakes Main_Thread up if it is in sleep state. Main_Thread releases the wakelock after calling stop.

In the normal scheme of things, the code in Listing 4 executes without any energy bug. However, consider the following sequence of events. Main_Thread sets the mKill flag, signals Worker_Thread to stop, and releases the wakelock. Then Worker_Thread wakes up, acquires the lock and exits the loop because of the mKill flag. As a result, the wakelock remains held by the app and is never released. A key point to note here is that the semantics of the stop( ) API called by Main_Thread does not guarantee that the return from the call will be synchronized, i.e., only after Worker_Thread exits. Had that been the case, there would have been no race condition and hence no no-sleep bug in the app.

Listing 4: No-sleep bug: race condition.

```
1    public void Main_Thread( ){
2        mKill = false;              //Unset kill flag
3        wl.acquire( );              //CPU should not sleep
4        start(worker_thread);       //Start worker
5        //....Do Something
6        mKill = true;               //Set kill flag
7        stop(worker_thread);        //Signal worker
8        wl.release( );              //CPU can sleep now
9    } //End Main_Thread( );
10   public void Worker_Thread( ){
11       while(true){
12           if(mKill) break;         //Break if flagged
13           net_sync( );             //Critical task
14           wl.release( );           //Rel. wl before sleep
15           sleep(180000);           //Sleep for 3 minutes
16           wl.acquire( );           //CPU should not sleep
17       } //End while loop;
18   } //End Worker_Thread( );
```

Listing 5: No-sleep code path due to runtime exceptions.

```
1    wake_lock_.acquire( );//CPU should not sleep
2    Object b = xyz.getObject( ); //b is a reference to an
     object
3    b.net_sync( ); //Perform critical task here
4    wake_lock_.release( );//CPU is free to sleep
```

Listing 6: Fixing no-sleep code path due to runtime exceptions.

```
1        wake_lock_.acquire( );
2    -   client = new AppengineClient(this);
3        Log.d(TAG, "onHandleIntent");
4    +   try {
5    +       client = new AppengineClient(this);
```

Listing 6: Fixing no-sleep code path due to runtime exceptions.

```
6                    //....
7         +          } finally {
8                          wake_lock_.release( );
9         +          }
```

Tracing no-sleep bugs in app source code caused by race conditions is particularly hard since it requires enumerating all the possible execution orderings of the threads. However, using our automatic techniques for detecting no-sleep bugs presented further below, we were able to detect an instance of a no-sleep bug caused by a race condition in the Android Email App, which had a similar pattern as shown in Listing 4.

This category of no-sleep bugs differs from the first two categories in a single aspect: the component woken up by the app is ultimately put to sleep by the app, but only after a substantially longer period of time than expected or necessary. For example, consider the code in Listing 1. Suppose routine net_sync( ) usually finishes in a few seconds, but during a particular run it hangs for an unexpected length of time before it returns, the battery is drained for that prolonged period of time.

While it is arguable that keeping the system on during the execution of a critical task, no matter how long it takes, was indeed the intention by the app developer, we characterize such situations as the third category of no-sleep energy bugs, no-sleep dilation. These are considered no-sleep energy bugs for the following reasons: (a) such instances of prolonged component wakeup are usually unexpected, even by the app developer, as we found by reading the log of code commits; (b) the mobile programming API documentation strictly warn developers not to keep the components awake for prolonged periods of time unless it is actually required, e.g., in the Skype app, where a user performing a video call requires the components (screen, CPU) to be switched on from the start till the end of the call irrespective of how long the call persists; (c) instances of no-sleep bugs in this category were observed to cause severe frustration among smartphone users since the energy drain was both severe and unexpected; and (d) the root cause of such prolonged completion time of critical tasks was usually because of a higher level bug (i.e., programming mistake) in the code, which significantly inflated the running time of critical task.

We found two causes for no-sleep dilation in smartphone apps: app delay and app optimizations. We first discuss the dilation caused by app delay in the GPS driver in Android. The driver held wakelocks for longer than needed. In some circumstances, after holding the wakelock, the driver issued a wait, waiting for an event. However, after being signaled, a second wait was issued causing another wait until the driver was signaled again. All this was done while holding a wakelock. As a result, a higher level bug in handling signals extended the time period the wakelock was being held.

Another cause of no-sleep dilation observed in the apps we studied results from poor placement of component wakeup code in the app. For example, consider the code in Listing 1. The dilation may happen if the app developer, instead of just protecting the critical part net_sync( ), wrapped a large piece of code in wake-locks. We observed such a bug in the MyTrack app where the developer acquired the CPU wakelock the moment the app was turned on and released it when the app completed. However, the critical part of the code was only the period where the user clicked the track button for location tracking.

Two general approaches exist to understanding program behavior: those done at compile-time and those done at run-time. Compile-time approaches incur no run-time overhead. While a run-time approach can gather perfect, or near perfect information about a given run, a compile-time approach will (conservatively) determine facts that may be true on any run. Because of the run-time overhead, embodiments of the present invention implement compile-time approaches when they are sufficiently accurate, as is the case with our problem. In various embodiments of the present application, a static, compile-time solution for detecting no-sleep energy bugs in smartphone apps is presented.

Embodiments of the present invention treat the acquire and release of a wakelock l as a definition of (assignment to) the variable $v_l$ corresponding to l. A definition d of a variable $v_l$ is said to reach some point p in a program if there exists a path from d to p that does not redefine Therefore, if a definition of $v_l$ corresponding to acquiring a wakelock reaches the end of some code region there exists a no-sleep code path in the region. Thus, detecting no-sleep code paths corresponds exactly to a reaching definitions (RD) dataflow problem, which can be solved by a standard compile-time dataflow the analysis.

In various embodiments, we first present our solution when a single thread is being analyzed. and then further embodiments will be used to show how to apply embodiments of the present invention to multi-threaded smartphone apps to detect no-sleep bugs arising from races.

In one or more embodiments, we first give an overview of dataflow analysis, and then describe our solution as a dataflow analysis problem. Dataflow analysis refers to a set of techniques that ascertain facts about program properties by analyzing the effects of statements along different paths of a control flow graph (CFG) on those properties. There exist many useful dataflow analysis, e.g., RD (discussed above), live variable analysis (which variable values are used after a block), and available expressions (which sub-expressions have already been computed and are unchanged yet).

Each node in a CFG is a basic block of statements, i.e., the block has exactly one entry point and one exit point. There exist a directed edge $(B_i, B_j)$ in the CFG connecting every pair of blocks $B_i$, $B_j$ such that block $B_j$ can execute immediately after block $B_i$. There is also an edge from every exception to every catch that might catch it. FIG. 1 shows an example of a dataflow graph. Two special blocks are added to the CFG: ENTER and EXIT. There exists an edge from ENTER to every block $B_i$=ENTER with no predecessor, and an edge from EXIT to every block $B_j$=EXIT with no successor. A forward dataflow analysis propagates facts about the program from the ENTER to the EXIT node while a back-ward analysis propagates information backwards through the graph from the EXIT to the ENTER node.

Each node in the CFG is annotated with two sets: GEN and KILL. The KILL set contains facts in the analysis that become false in this node, and the GEN set contains facts that become true. Each node also has an IN and an OUT set. The sets associated with a block B can be denoted as IN[B], OUT[B], GEN[B], and KILL[B]. For a forward (backward) analysis the IN (OUT) set will contain facts that are true immediately before the node is visited, and the OUT (IN) set will contain facts that are true immediately after the node is visited. The transfer function describes how the OUT (IN)

set is computed from the OUT (IN), KILL and GEN sets. For simplicity a forward analysis is considered from this point on.

CFGs with branches contain join points where multiple paths come together, e.g., the block containing statements d8 and d9 in FIG. 1. A meet operation decides how the values coming from the predecessor node are combined to form the value of the IN set. If the CFG contains cycles, an iterative algorithm that visit nodes repeatedly is used until the analysis converges to a fixed point such that revisiting all of the nodes does not change the values of any IN or OUT set. The algorithm works by adding the ENTER node to a work list. As nodes are processed, if their OUT set changes, their successors are added to the work list. When the work list is empty the algorithm has converged at a fixed-point.

We note that all dataflow schemas compute approximations to the actual ground truth. The actual problem being solved is undecidable (e.g., constant propagation). This is because it is undecidable, in general, if a particular path along a CFG will be taken during a program's execution. As a result, dataflow solutions return conservative or safe estimates to the actual problem. A conservative approach guarantees that the results obtained by the analysis will err on the side of safety. Thus while an RD analysis may say more definitions reach some point than actually do, it will never fail to find all definitions that do reach a program point.

The first task in applying these concepts to the RD problem is to construct a CFG. Next, we define the GEN and KILL sets for each block B. The last assignment to a variable v in the block creates a definition d of v that can reach other statements outside the block, and therefore the definition is placed in the GEN set. Thus for block B1 of FIG. 1, the definitions at d1, d2, and d3 can reach the other blocks, and therefore are added to B1's GEN set. The definition of the KILL set comes from the following observation: an assignment to some variable v in a block prevents any definition of the variable v outside from flowing through the block. Thus any definition outside the block become members of the KILL set. Thus in block B5, definition d8 causes definition d4 to be in the KILL set.

We now define the IN set. Consider the set of predecessors of some block B. Any definition that is in the OUT set of one of these predecessors can reach B, and thus is in IN[B] set of B. Therefore, IN[B] is the union of the OUT sets of all of its predecessors, e.g., IN[B2] is OUT[B5] ∪ OUT[B1].

Interprocedural analysis, which incorporates the effects of routine calls and routine arguments, is beyond the scope of this discussion but is covered in detail in E. M. Myers, "A precise inter-procedural data flow algorithm," in POPL. ACM, 1981, which is incorporated by reference herein.

In accordance with embodiments of the present invention, we now formulate the single-thread no-sleep code path problem as an RD problem, and show how to solve it using standard dataflow analysis. We analyze non-reference counted, no-timer wakelocks and exotic component power APIs.

For no-sleep code path analysis, we are interested in the points in the code path where the smartphone component power is managed, e.g., the points in the CFG where wakelocks for the CPU or screen are acquired or released, or points where the camera is turned on and off. As a result, the domain of the dataflow problem is a set consisting of component wakelocks for traditional components and component power management assignments for exotic components. For brevity, from now on we use wakelocks to refer to the power control handles for both traditional and exotic components.

Once the transformation is completed, the no-sleep code path problem is reduced to finding the RD in the transformed CFG, i.e., finding which definition of a wakelock reaches the EXIT node of the CFG. If only those definitions that declare all the variables as 0 (i.e., the component can sleep) reach the EXIT node, the code is said to be free of no-sleep bugs, since all of the possible code paths put all accessed components to sleep before reaching the end of the CFG, and therefore the end of the code.

Solving the code path problem. We now show how to apply the standard iterative algorithm for dataflow analysis to solve our no-sleep code path problem.

For our no-sleep code path problem, the set of non-zero variable definitions reaching the EXIT node represents the no-sleep code path bugs in the app. Table 3 illustrates, for each block B, the IN[B] and OUT[B] sets at the end of three iterations. It shows the IN[B] and OUT[B] sets are the same at the end of the second and third iteration, and hence the algorithm has reached a fixed-point and converged in three iterations. The value of OUT[EXIT] in the last iteration contains the reaching definitions at the end of the code: all definitions but d1 and d4 can reach the end of the code, including d2, d5 and d8 which indicate the existence of a no-sleep bug. Their presence indicates no-sleep code paths along which a component (GPS, camera, and CPU wakelock_2, respectively) is woken up but not put to sleep.

TABLE 3

Computing IN and OUT for no-sleep code paths

| Block B | OUT[B]$^0$ | IN[B]$^1$ | OUT[B]$^1$ | IN[B]$^2$ (=IN[B]$^3$) | OUT[B]$^2$ (=OUT[B]$^3$) |
|---|---|---|---|---|---|
| B1 | { } | { } | $\{d_1, d_2, d_3\}$ | { } | $\{d_1, d_2, d_3\}$ |
| B2 | { } | $\{d_1, d_2, d_3\}$ | $\{d_1, d_2, d_3, d_4, d_5\}$ | $\{d_1, d_2, d_3, d_5, d_6, d_7, d_8, d_9\}$ | $\{d_1, d_2, d_3, d_4, d_5, d_7, d_9\}$ |
| B3 | { } | $\{d_1, d_2, d_3, d_4, d_5\}$ | $\{d_1, d_2, d_3, d_4, d_6\}$ | $\{d_1, d_2, d_3, d_4, d_5, d_7, d_9\}$ | $\{d_1, d_2, d_3, d_4, d_6, d_7, d_9\}$ |
| B4 | { } | $\{d_1, d_2, d_3, d_4, d_6\}$ | $\{d_1, d_3, d_4, d_6, d_7\}$ | $\{d_1, d_2, d_3, d_4, d_6, d_7, d_9\}$ | $\{d_1, d_3, d_4, d_6, d_7, d_9\}$ |
| B5 | { } | $\{d_1, d_2, d_3, d_4, d_5, d_6, d_7\}$ | $\{d_2, d_3, d_5, d_6, d_7, d_8, d_9\}$ | $\{d_1, d_2, d_3, d_4, d_5, d_6, d_7, d_9\}$ | $\{d_2, d_3, d_5, d_6, d_7, d_8, d_9\}$ |

Finally, the OUT set for a block B must be computed. The OUT set is simply the IN set with the effects of flowing through the block applied to it. The expression IN [B]−KILL [B] gives those definitions that reached the block and can reach later blocks, and unioning this with the GEN set gives all definitions that can pass through this block and reach other blocks. Thus $f_B$: OUT[B]=GEN[B]∪(IN[B]−KILL[B]) is the transfer equation for block B.

Java runtime exceptions (RTE) (e.g., null pointer and array index out of bounds exceptions) can be thrown during normal Java Virtual Machine (JVM) operations. RTEs that are handled explicitly by a try-catch block in code are handled as before by adding a path from the source block to the handler block. However, RTEs are often not handled by a program and the thread raising the exception is terminated by the JVM when the exception is thrown.

Uncaught RTEs are a source of no-sleep bugs and must be handled by our analysis. Consider the code in Listing 5. A CPU wake-lock is acquired, followed by a call to the critical routine from in-stance b. The wakelock is released after the call. If a RTE is raised (e.g., a null pointer exception on line 3 caused by b being null), the thread is halted. This results in a no-sleep energy bug since the thread terminates before the wakelock is released. We identified an instance of this bug in our characterization study. Listing 6 details the patch applied by the developer to fix a null pointer RTE (code lines appended with "−" or "+" indicate that these lines were removed from or added to the new version, respectively). The developer added handlers for the null pointer RTE and moved the lock release into a finally block to ensure that it is run regardless of any exceptions.

In contrast, embodiment of the present invention may place an edge from each RTE that is not handled within a routine to the EXIT node for that routine. This creates a path for a lock acquire definition to reach the exit, and could lead to more false positives (although we have not seen that in our test cases). In alternative embodiments, techniques such as null pointer analysis, ABCD for array bounds check, and RTE analysis techniques, may also be applied to make the analysis more precise and generate fewer false positives.

Android app programming is primarily event-based programming. Unlike traditional code, where the main( ) routine starts the app with the app exiting when main( ) returns, Android app programming typically consists of several functions which are event handlers, one corresponding to each event the app handles. These events may be a button click, an incoming call, a notification from server, a response from a component (e.g., GPS), etc. Each event handler is invoked when the event is fired and the handler may in turn invoke a tree of routines underneath it before exiting.

Handling multiple entry points of an app creates a new challenge: each handler has its own CFG, and a component may be turned on in one event handler and put to sleep under another (e.g., start camera when start button is clicked and stop camera when stop button is clicked). However, the order of execution of the different events, which is needed to stitch together the CFGs of different handlers, may be unknown at compile time and depends on user interactions.

In various embodiments, we handle this complication as follows. For common event handlers (e.g., on Create, onPause) which have known invocation orders, we simply perform the RD analysis across them on the combined CFG obtained from stitching together individual CFGs following those invocation orders. For example, if a component is not put to sleep when the app is paused after being first created, it usually is a sign of a no-sleep bug. For the remaining handlers, we ask the developers to specify all expected invocation orders, and then perform no-sleep bug RD analysis on the combined CFG for these orders.

To statically detect possible no-sleep race conditions for multi-thread apps, we adapt the RD dataflow analysis previously developed for parallel programs.

A multi-threaded program typically has a repeating pattern of sequential sections ending with a thread fork, interleaved execution of parallel threads followed by a thread join, followed by the next sequential section in the pattern. Execution is sequential within each thread and so a CFG can be built for the thread. CFGs for different threads can be stitched together by connecting the fork spawning the thread with the ENTRY node for the thread's CFG, and the EXIT node of the CFG with the join node using a parallel control edge.

The RD analysis is now modified for this new CFG. Three observations motivate these modifications. First, all threads in a parallel section are executed. Second, any of the definitions $d_{ti}, d_{tj}, \ldots, d_{tk}$ to some variable v executing in different threads, and not ordered by synchronization, may be the last definition of v to execute, therefore no such definition p can be said to kill another definition $d_{tq}$, p, q ∈{i, j, ..., k}. Third, any kill performed unconditionally by any thread in a parallel section (i.e., along all sequential paths through the thread) kills all definitions that occur before the parallel section's fork. Fourth, any definition d performed conditionally within a thread does not kill definitions d' before the thread's parallel section's fork since either d or d' may reach the parallel section's join, and following statements. The details of modifying the dataflow analysis to account for these additional constraints and ordering synchronization are discussed in detail in D. Grunwald and H. Srinivasan, "Data flow equations for explicitly parallel programs," in PPoPP, 1993, which is incorporated by reference herein, and therefore not repeated here.

Figure 2:
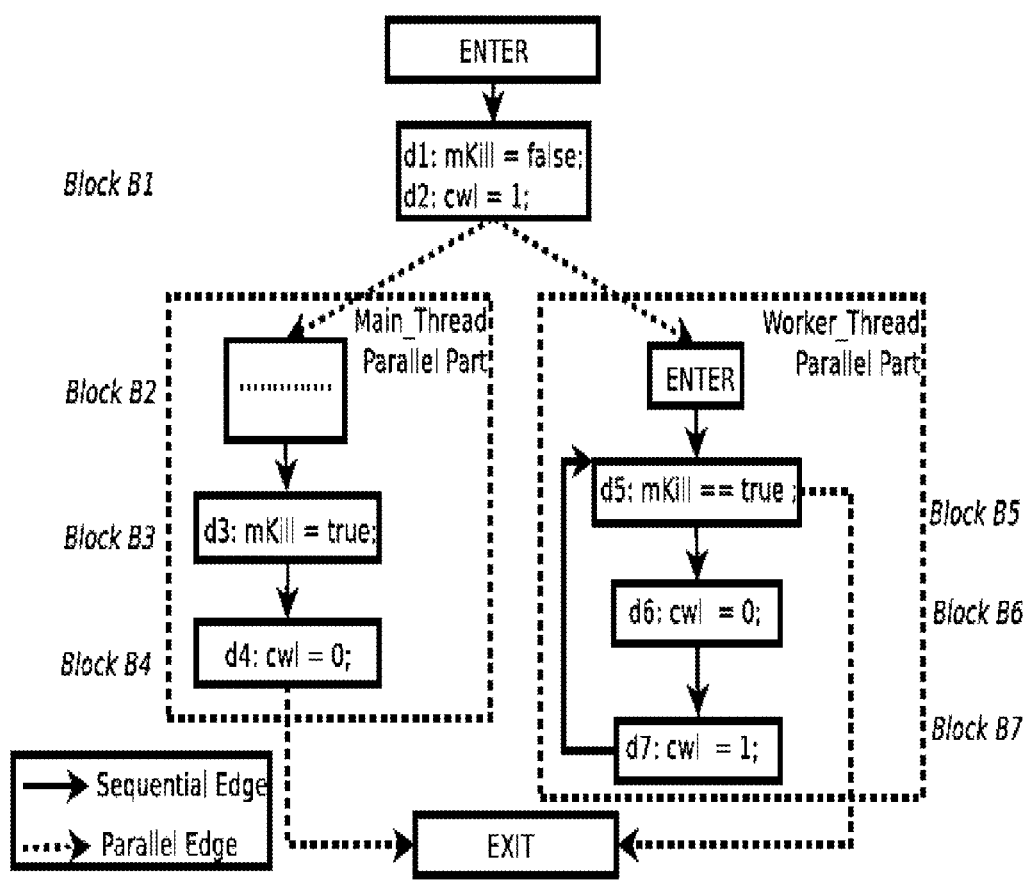
FIG. 2 illustrates a tracing no-sleep race bug with a parallel flow graph (PFG) for a code in Listing 4.

FIG. 2 illustrates that the RD analysis on the PFG finds that definitions $d_3$, $d_4$ and $d_7$ can reach the EXIT node. Since $d_7$ turns on the component, this is a no-sleep race bug.

ProGuard Extension: We implemented no-sleep bug tracing as a 1K-LOC extension to ProGuard. The ProGuard tool is used to shrink, optimize and obfuscate Android code and helps to make smaller .apk installer files. It builds an intermediate representation of the input source containing CFGs that we use. ProGuard is chosen as an illustration since it is integrated into the Android build system, it automatically runs when an Android app or the framework is compiled and does not require a separate, manual invocation. However, source code is not required to perform the analysis since ProGuard can run directly on the bytecode generated by the Java compiler. If we have the .apk installer for an app we first use use ded to decompile the embedded .dex files (Dalvik Executable) and convert them to Java bytecode (.class files). We then run ProGuard and the no-sleep bug dataflow analysis on the .class bytecodes.

Handling Object References and Intent Resolution: Java object references and intent resolutions are indirect control transfer mechanisms in the Android framework and apps. An indirect control transfer mechanism poses problems for static analysis since it is difficult to determine at compile time which class the object is an instance of, or which handler will service the intent, and hence which particular method (routine) will be called. We use a conservative approach by analyzing all routines' references that could possibly be referred to at runtime.

Handling Special Code Paths: To reduce the number of false positives, we handle the two special cases shown in Listing 7. Two wakelocks (wl1, wl2) are acquired before if conditions and are released under their respective if. We found these two usages to be common in mobile apps. The RD no-sleep bug analysis for code in Listing 7 would flag both lock acquires as reaching the end of the block since they are not released in the else branches. However, in both cases, it is evident that there is no bug since if the wakelock is either null or not held, it need not be released. We handle these two common usages specially, by inserting an else branch to the if condition which contains a definition of release( ).

Runtime Exceptions: In our characterization study, we did not observe any occurrences of uncaught RTEs other than null pointer exceptions (NPEs). To handle NPEs, we trace the null reaching definitions at each access point of the object for every object declared in the program. If a null definition reaches an object access point, we add a path from that point to the EXIT node in the CFG.

Race Conditions: Our current implementation implements analysis for no-sleep race condition for programs without synchronization points. Handling synchronization points may be implemented by adopting the techniques proposed in D. Grunwald and H. Srinivasan, "Data flow equations for explicitly parallel programs," in PPoPP, 1993.

We now present experimental results of no-sleep bug detection using our dataflow analysis based no-sleep bug detection tool. We first present a summary of the detection results on 500 apps running on Android and then discuss false positives and the runtime of the scheme.

Listing 7: Handling simple code paths.

| | | |
|---|---|---|
| 1 | wl1.acquire( ); wl2.acquire( ); | //wakeup |
| 2 | if(wl1 != null) | //if object is not null |
| 3 |    wl1.release( ); | //release the wakelock |
| 4 | if(wl2.isHeld( )) | //if wl2 is acquired |
| 5 |    wl2.release( ); | //release the wakelock |

Methodology: We collected app installers (.apk files) for 500 apps, including popular apps like Facebook, Google apps such as gtalk and stock apps in the Android framework including Email and Dialer. These include all the apps listed in Table 2. Automatic analysis of the manifest.xml file for permissions reveals that 187 apps explicitly manipulate component wake/sleep cycles. We then decompiled the .apk installers using ded and obtained 86 apps that were decompiled to bytecode and Java source code. For these 86 apps, we ran our detection analysis tool directly on the bytecode, and then used the decompiled Java source code to identify false positives incurred by our analysis. Table 4 gives a breakdown of the apps (left) and causes of bugs in them (right).

No-Sleep Bug Analysis: Manually enumerating all possible paths in the program to verify the correctness of the tool along each of those paths is not humanly possible due to the exponential number of paths. We used the following approach. For each of the 86 apps, we manually tally the no-sleep bugs (no-sleep code paths in single threads). We then check if the bugs had been reported by the tool. Using this approach we segregated the apps into four categories.

True Positive (TP) are Apps in which we manually found the bug and it was reported by the tool. True Negative (TN) are Apps in which we could not manually find bugs and the tool reported no bug. False Positive (FP) are Apps in which we did not find bugs manually, but the tool reported bugs. False Negative (FN) are Apps where we found a bug manually but the tool did not. The last category contained no apps. Table 4 summarizes the results. We found 31 apps in the TN set, 13 apps in the FP set and 42 apps in TP set. Below we break down these 42 apps according to the causes.

TABLE 4

Summary of detecting no-sleep code paths.

| App type breakdown | # | Breakdown of 42 apps that contain no-sleep code paths | # |
|---|---|---|---|
| Total input set of apps | 500 | New bugs | 30 |
| Manipulated component | 187 | In the framework | 6 |
| Fully decompiled | 86 | Incorrect event handling | 26 |
| No-sleep code paths | 42 | if, else + exception paths | 12 |
| False positives | 13 | Forgot release (incl. Services) | 3 |
| True negatives | 31 | Miscellaneous | 1 |

TABLE 5

Summary of no-sleep code paths for 5 popular apps.

| App | KLOC (# classes) {# lib class} | # wakelock objs (# acq def.) {# rel. def.} | Analysis time (sec) |
|---|---|---|---|
| Facebook v1.3.0 | 93.5 (712) {710} | 1 (256) {128} | 408 |
| Telephony | 74.8 (326) {495} | 7 (18) {29} | 53 |
| Exchange | 17.0 (626) {952} | 1 (19) {12} | 51 |
| SipService | 3.8 (43) {366} | 2 (6) {8} | 33 |
| CW | 0.3 (8) {100} | 1 (1) {1} | 3 |

Listing 8: No-sleep code path: false positives.

```
1      //Use a routine to manipulate component
2      void WakeUpCPU(boolean wakeup){
3          if(wakeup) wl.acquire( ); //wakeup
4          else wl.release( ); //release the lock
5      } //End WakeUpCPU
6      void CriticalTask( ){
7          WakeUpCPU(true); //acquire the lock
8          // Do critical task ...
9          WakeUpCPU(false); //release the lock
10     } //End CriticalTask
```

Listing 9: No-sleep code path: false positives in the Dialer App.

```
1      void HandleIncomingCall( ){
2          if(caller != BLACKLISTED) wl.acquire( );
3          else return;
4          //....Handle rest of incoming call
5      } //End HandleIncomingCall
6      void DisconnectCall( ){
7          if(caller != BLACKLISTED) wl.release( );
8          else return;
9          //....Handle rest of disconnecting call
10     } //End DisconnectCall
```

Incorrect event handling (26): The largest category of bugs in these apps are bugs from inappropriate handling of events in Android apps, specifically the handlers in the default Android activity cycle: on Pause( ) and onStop( ). An activity is a single focused window that a user interacts with. It is the foreground GUI part of an app that the user sees. The framework calls the on Pause( ) event routine of the activity in the app whenever the activity is interrupted by another activity coming in front of it, e.g., an incoming phone call displaying an "incoming call-box" while the user is playing a game. Once the activity is completely sent to the background, i.e., the activity is no longer visible, the framework calls on Stop( ). The framework calls on Destroy( ) when the app finally exits.

The bug occurred in any app that wakes up a component when it is started or resumed in the default event handlers on Create( ) or on Resume( ), respectively, and lets the component sleep only when the app finally exits, in handler on Destroy( ). For example, when such an app is interrupted during this interval by another activity started by the user (like clicking the home screen, or starting another app), the respective component is kept awake since the original app is frozen and may not run for a long time. We observed instances of this bug in 26 apps involving CPU wakelocks (in 23) and GPS (in 3).

If-else +exceptions (12): In 12 apps, including Agenda Widget and Android Email App (Table 2), not all paths (using if-else) released the component. Also, no-sleep code paths akin to the code in Listing 2 were observed in apps including the Facebook and Android Email apps. The component (CPU in these cases) was not allowed to sleep in case of a thrown exception.

Forgot to release a wakelock (3): In K9mail, Agenda Widget and SIP service, the programmer forgot to release the CPU wakelock.

Miscellaneous (1): In Android WifiService, the wake-lock is not released in all cases of received messages.

False positives (13): 13 apps were reported to contain a no-sleep path, but upon further manual analysis, they turned out to false positives, as discussed next.

We also detected a no-sleep bug caused by a race condition in the Android Email app, as was discussed in detail above.

Reasons for False Positives: There were two major reasons for the false positives reported in the 13 apps: use of helper functions or variables for component access, and interference of higher level app logic in lock placement.

Helper functions/variables (3): The code in Listing 8 describes an app using a helper function for wakelock manipulation. Routine WakeUpCPU(boolean) manipulates the wakelock depending on the boolean input variable. Routine CriticalTask( ) acquires and releases the wakelock using the helper routine by passing true and false as input arguments. RD analysis of routine WakeUpCPU(boolean) suggests that one code path (the if branch of the condition) reaches the end of the routine and hence there exists one path in routine CriticalTask( ) that reaches the end of the routine with the wakelock held.

Similarly, we found apps to use additional helper variables to track the liveness status of the component instead of relying on standard API routines (e.g., isHeld( )) that come bundled with the Android framework. The boolean helper variable is toggled each time the component is switched on or off and is checked before setting the component free. This use of multiple variables to achieve a single purpose not only results in false positives in our static analysis of no-sleep bugs, but also was previously found to be the root cause of multi-variable access bugs.

(b) Higher level App logic (10): Listing 9 demonstrates a false positive observed in the Android Dialer app due to higher level app logic. The incoming call handler acquires the wakelock if the caller is not blacklisted by the user and otherwise it immediately returns. Similarly, when the call is disconnected, the app releases the wakelock when the caller was not blacklisted. This induces a false positive in static reaching definitions analysis since the acquire( ) in HandleIncomingCall( ) reaches the end of DisconnectCall( ).

Analysis Runtime and Wakelock Statistics: Table 5 presents detailed statistics of no-sleep bugs in 5 popular apps. For each app, the table shows the LOC, the number of classes in the app and in the libraries, the number of wakelocks, and how many times they were defined, i.e., acquired and released, and the time taken to run the no-sleep code path analysis.

From the table we see that the runtime of the analysis varied from 3 seconds (for CommonsWare (CW), 0.3 KLOC) to 408 seconds for FaceBook (93.5 KLOC decompiled). The 3 services that belong to the Android framework took about 50 seconds to perform the code analysis. Since the tool performs off-line static analysis, i.e., on a desktop/server, there is no energy drain on the mobile devices. The table also shows that the Telephony service in Android holds 7 different wakelocks (all with option PARTIAL_WAKE_LOCK) with 18 acquire and 29 release definitions, for different utilities, including CDMA connection, GSM connection, SMS Dispatcher, Radio Interface Layer, etc. Other apps utilize one or two wakelocks. Although the FaceBook app manipulates only one wakelock, the wakelock APIs could be called from multiple locations, resulting in a total of 256 acquire and 128 release definitions.

Battery Drain of No-Sleep Bugs: Table 2 lists the amount of time it will take to drain a fully charged battery under typical usage on the Google Nexus One phone due to the corresponding no-sleep bugs.

Real App CFG (Android Email App): To illustrate the complexity of the apps, apart from the number of lines of code and number of wakelock objects shown in Table 5, we show in FIG. 3 a trimmed down version of the CFG of one of the central routines in the Android Email app, runPingLoop( ). The nodes in the graph show branch points. These include, but are not limited to, handling error conditions such as (a) PING returned empty, (b) PING returned with a login failure, (c) NAT failure, (d) synchronization aborted by the user, and (e) alarm event trigger. The left-most node (solid black) denotes the entry point and the right-most node denotes the exit point. The edges depicted in thick black lines are the ones along which the CPU wakelock is being held, while edges in dotted green lines are when wakelocks have been released. Out of the four edges reaching the exit node, only one reaches after releasing the wakelock.

Debugging in Mobile Environments: Diagnosing bugs in smartphone environment is a new domain, and there is little existing work. MobiBug is a framework for mobile debugging that focuses on how to perform lightweight logging on resource-limited smartphones. See, S. Agarwal, R. Mahajan, A. Zheng, and V. Bahl, "There's an app for that, but it doesn.t work. diagnosing mobile applications in the wild," in Hotnets, 2010. It proposes three ideas: spreading the logging task among many phones, building a conditional distribution model for the app behavior and its dependencies, and sampling what each phone logs. MobiBug is designed to be a runtime traditional bug tracing system, targeting bugs that usually result in app crashes. However, energy bugs differ from traditional bugs in that they do not lead to any app crash. Rather, the apps continue to work normally except that the battery drains rapidly. Pathak et al. presents a taxonomy of many types of energy bugs in smartphones and estimates no-sleep bugs to constitute about 70% of all energy bugs in smartphone apps. See, A. Pathak, Y. C. Hu, and M. Zhang, "Bootstrapping energy debugging for smartphones: A first look at energy bugs in mobile devices," in Proc. of Hotnets, 2011.

Applications of Reaching Definitions: Reaching definitions analysis has many uses, and most are part of the compiling folklore. See, e.g., A. Aho, M. Lam, R. Sethi, and J. Ullman, "Compilers: principles, techniques, and tools," Pearson/Addison Wesley.

Debugging Software Concurrency Bugs: Debugging traditional software bugs on non-mobile devices is a well-studied topic. There have been several bug characterizing studies (See e.g., S. Lu, S. Park, E. Seo, and Y. Zhou, "Learning from mistakes—a comprehensive study on real world concurrency bug characteristics," in ASPLOS, 2008; Z. Yin, X. Ma, J. Zheng, Y. Zhou, B. Lakshmi, and S. Pasupathy, "An empirical study on configuration errors in commercial and open source systems," in SOSP, 2011) which classify different categories of software bugs, e.g., concurrency bugs, semantic bugs, and configuration bugs. The debugging solutions fall into three categories: static, dynamic, or hybrid analysis. Some examples of static analysis include Racerx [e.g., D. Engler and K. Ashcraft, "Racerx: Effective, static detection of race conditions and deadlocks,"

SOSP, 2003] which uses a flow sensitive, inter-procedural analysis to detect data races and dead-locks, and MUVI [S. Lu, S. Park, C. Hu, X. Ma, W. Jiang, Z. Li, R. Popa, and Y. Zhou, "Muvi: automatically inferring multi-variable access correlations and detecting related semantic and concurrency bugs," in SOSP, 2007] which applies data mining to infer patterns of multi-variable access correlations.

Embodiments of the present invention for no-sleep energy bugs fall in the realm of static analysis, and are based on reaching definitions analysis.

In various embodiments of the present invention, this work describes the first advances towards understanding and automatically detecting software energy bugs on smartphones. First, it presents the first comprehensive real world no-sleep energy bug characterization study. Our study reveals three major causes of no-sleep energy bugs and provides useful guidelines and hints to design effective detection schemes. Second, it proposes the first detection solution, based on the classic reaching definitions dataflow analysis, to automatically infer potential no-sleep bugs in an app. Third, evaluation of our tool on 86 Android apps and the Android framework shows that our tool accurately detected all reported instances of no-sleep bugs, as well as 30 instances of new no-sleep bugs.

Embodiments of the present invention may be applied over a wide range of smartphone energy bug applications. For example, embodiments of the invention may be applied to develop solutions to no-sleep dilation bugs, or explore run-time and hybrid compile-time and run-time solutions to no-sleep bugs. Embodiments of the invention may also be applied to develop solutions to characterize and detect other types of energy bugs in smartphone apps, understand energy bugs in the smartphone OSes, and develop better programming language support to avoid no-sleep bugs at programming time.

Figure 4:
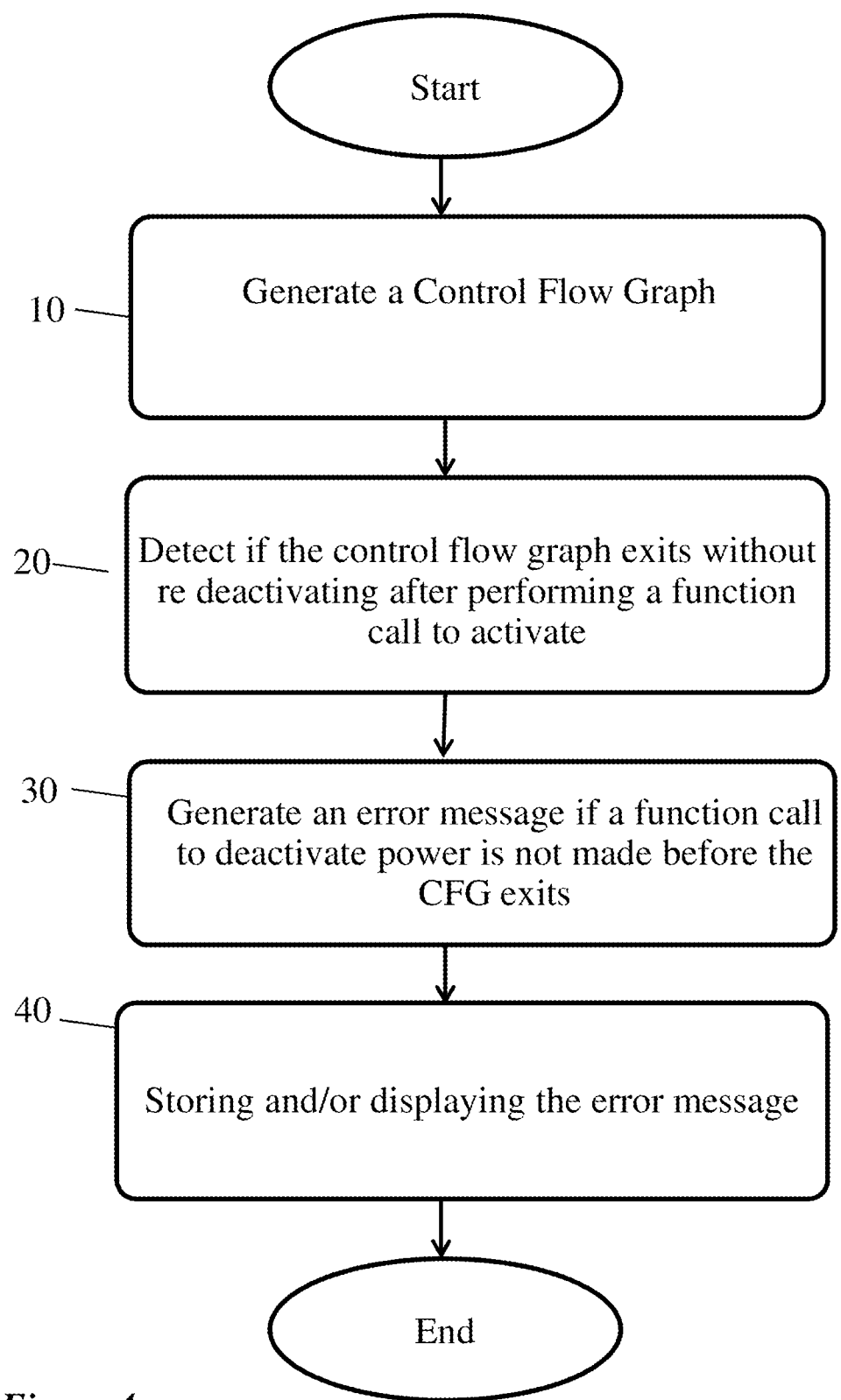
FIG. 4 illustrates a sequence of processes used to debug a code to identify power bugs for a device in accordance with an embodiment of the present invention.

FIG. 4 illustrates a sequence of processes used to debug a code to identify power bugs for a device in accordance with an embodiment of the present invention.

Figure 3:
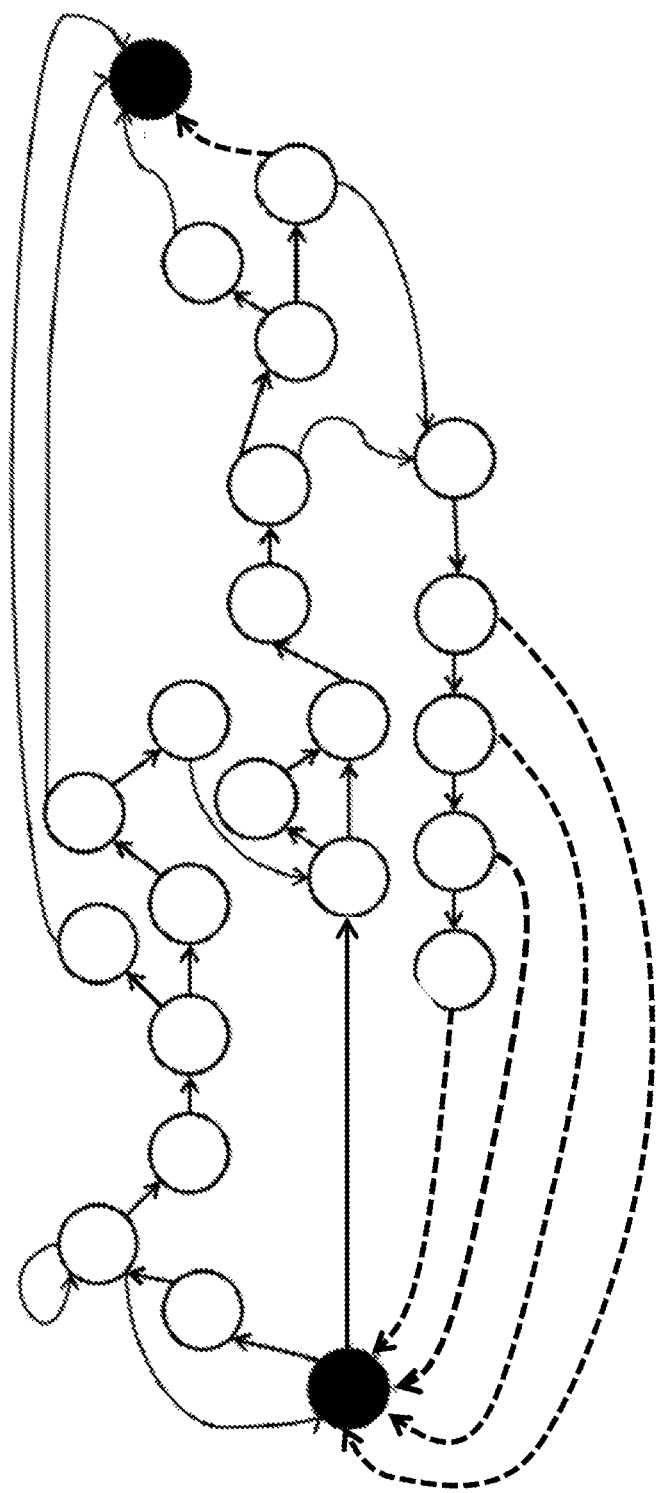
FIG. 3 illustrates a trimmed down version of a control flow diagram (CFG) of one of the central routines in the Android Email app.

In accordance with an embodiment of the present invention, a computer-implemented method for creating computer executable instructions from a computer code comprises generating a control flow graph for at least a portion of the computer code. The control flow graph may be generated for all of the computer code in one embodiment, or alternatively for a given routine, function, or module in various embodiments (box 10). An example of the control flow graph is illustrated in FIG. 3 above.

Next, the method comprises detecting by traversing the control flow graph if the control flow graph exits without performing a function call to deactivate power to any component of a device configured to execute the computer executable instructions after performing a function call to activate power (box 20). For example, the function call to activate (or deactivate) power may comprise function calls to activate (or deactivate) processor of the device, display of the device, the global positioning system unit, a micro-electro-mechanical device unit, an input device such as keyboard, an antenna, and others. In one or more embodiments, the device may be power constrained device such as a smart phone, a tablet, a laptop, and other portable devices.

The method further includes generating an error message if the control flow graph exits without performing a function call to deactivate power to any component (box 30). Accordingly, in one or more embodiments, the method comprises identifying mismatch in function calls to power activation and deactivation by traversing through all possible paths within the control flow graph. For example, the mismatch may be identified by identifying definitions with a function call to power activation. The error message is stored in a non-transitory storage medium, and/or output a display (box 40).

In various embodiments, the non-transitory storage medium may include a volatile memory such as SRAM, DRAM, a non-volatile memory such as a magnetic drive, a flash drive such as a NOR or a NAND flash, an optical medium such as a DVD, a CD, and others.

In one or more embodiments, no sleep bugs such as no sleep code paths and no sleep race conditions are detected and removed using reaching definitions dataflow analysis.

In various embodiments, the computer code may be identified as being devoid (at least does not have the major type of) of power bugs and may be compiled to form an executable code that may be subsequently executed in the device such as the smart phone. The executable code may be stored in the same or different memory from the memory storing the error message and/or computer code.

Figure 5:
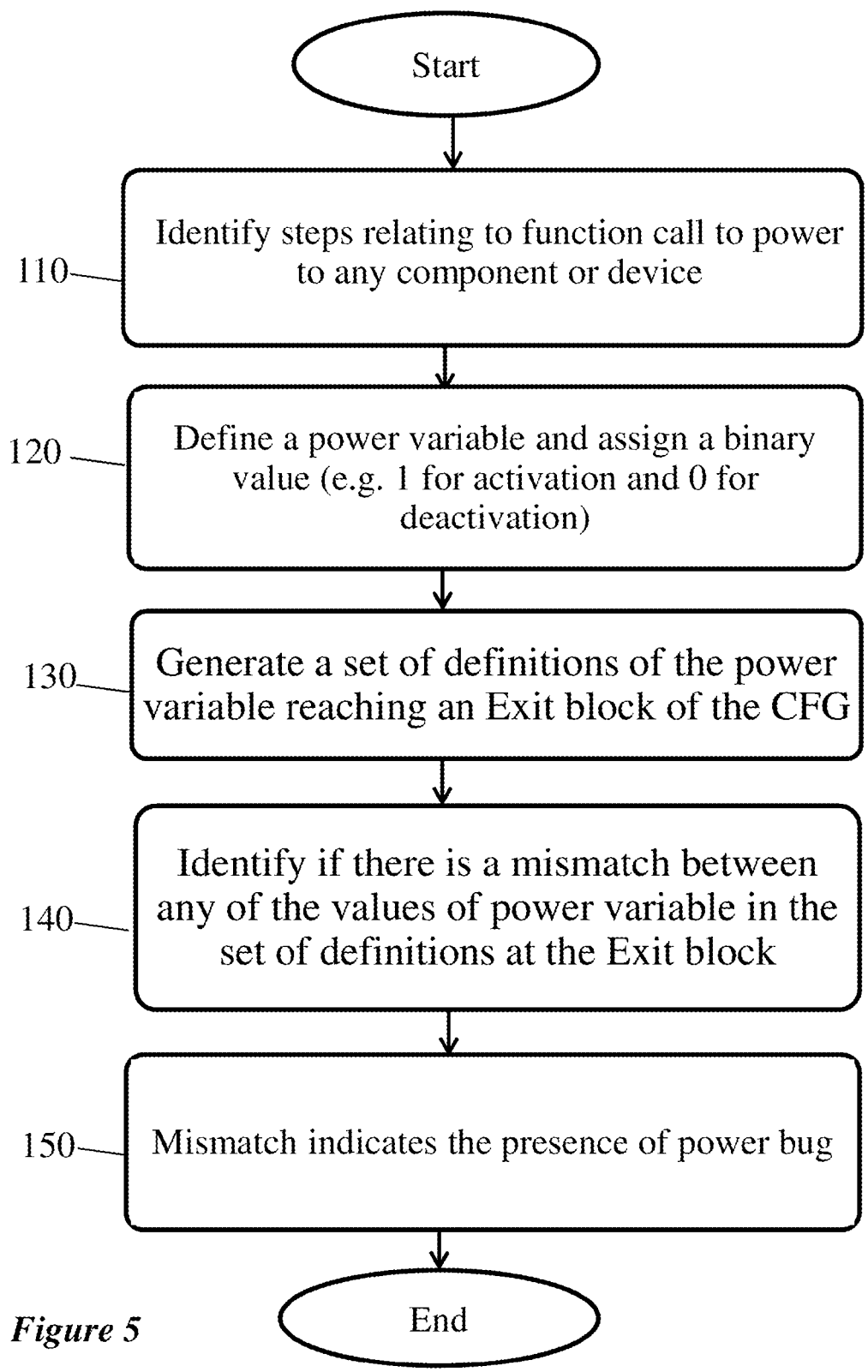
FIG. 5 illustrates a sequence of processes used to debug a code for a device using a reaching definitions analysis in accordance with an embodiment of the present invention.

In various embodiments, a forward dataflow analysis or a backward dataflow analysis may be performed to identify mismatches in the function calls to power features within the control flow graph. In one embodiment, a reaching definitions analysis is performed, which may be performed for both single threaded and multi-threaded applications. In one or more embodiments, reaching definitions analysis is used to identify mismatch in definitions relating to function calls for activating power or function calls for deactivating power reaching an EXIT block of the control flow graph. The EXIT block may be connected to every block in the control flow graph with no successor FIG. 5 illustrates a sequence of processes used to debug a code for a device using a reaching definitions analysis in accordance with an embodiment of the present invention.

In various embodiments, applying the reaching definitions analysis comprises identifying steps in the control flow graph with function calls for activating or deactivating power (box 110). A power variable is defined for each step with a function call for activation and for each step with a function call for deactivation (box 120). Next, the power variable is assigned a binary value, for example, a call to an activation step may result in assigning a value of "1" while a call to a deactivation may result in assigning a value of "0" (box 120). A set of definitions of the power variable reaching an EXIT block of the control flow graph is computed (box 130). This may require an iterative computation process. Thus, the set of definitions of the power variable may include the value of the power variable through all possible paths through the control flow graph. Next, any definition with a binary value "1" corresponding to the activation step remaining in the set of definitions of the power variable reaching the EXIT block is identified (box 140). Such an activation state indicates the presence of a power bug (box 150) and an error message may be generated.

Figure 6:
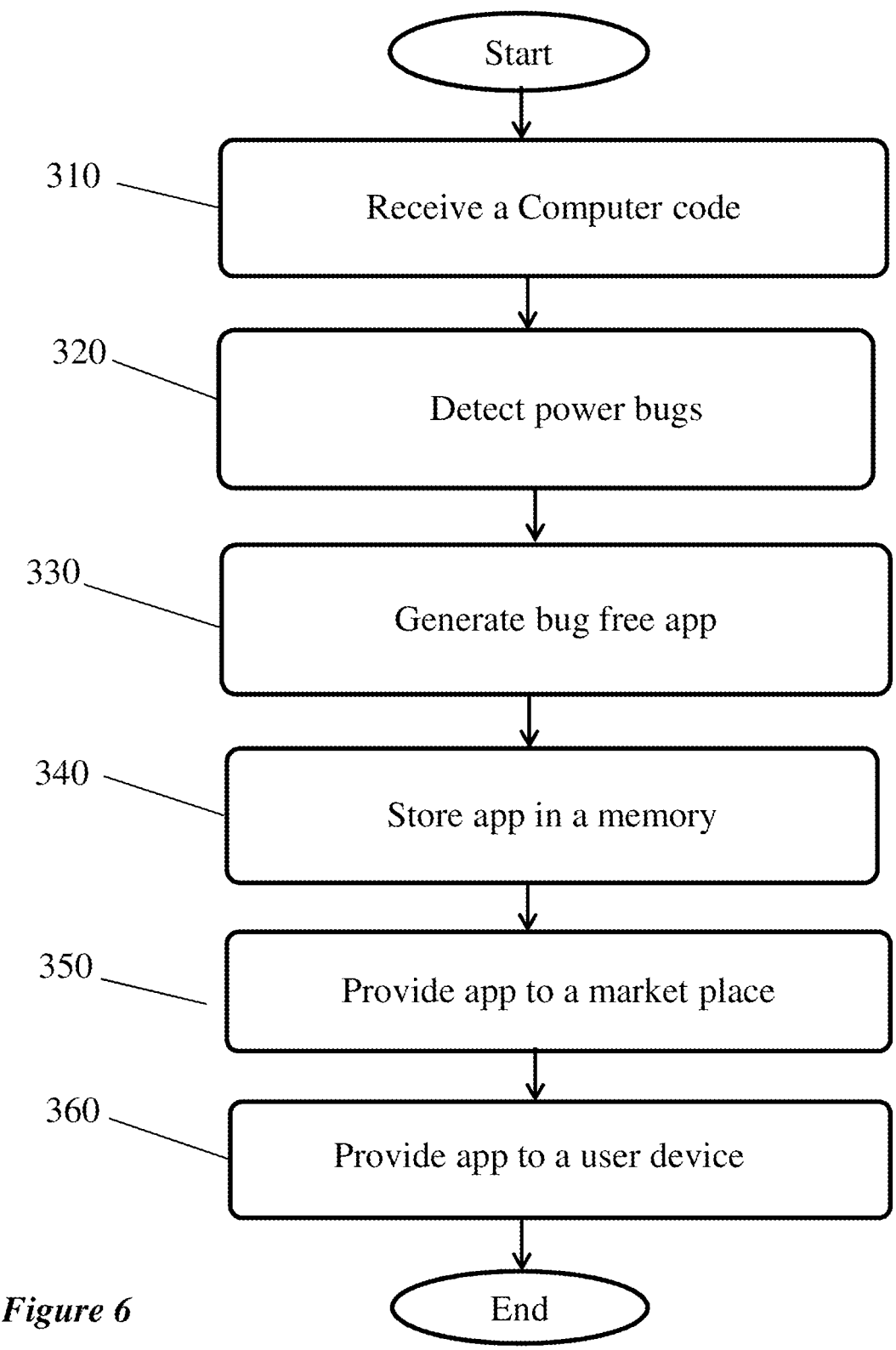
FIG. 6 illustrates a sequence of processes used to generate applications void of power bugs for a device in accordance with an embodiment of the present invention.

FIG. 6 illustrates a sequence of processes used to generate applications void of power bugs for a device in accordance with an embodiment of the present invention.

Referring to FIG. 6, a computer code is received at a server (box 310). The server is configured to detect power bugs as described in various embodiments of the present invention (box 320). Next, the computer code may be cleaned up to remove any detected power bugs. For example, in one or more embodiments, no sleep bugs such as no sleep code paths and no sleep race conditions are detected and removed using reaching definitions dataflow analysis. If no further power bugs are detected, the computer code may be compiled and converted into an application (box 330). This application may be stored in a memory of the server or other servers (box 340). Next, the bug free application is provided at a market place for user consumption (box 350). The application is provided to a user device, which may download the application onto the user device (box 360).

Figure 7:
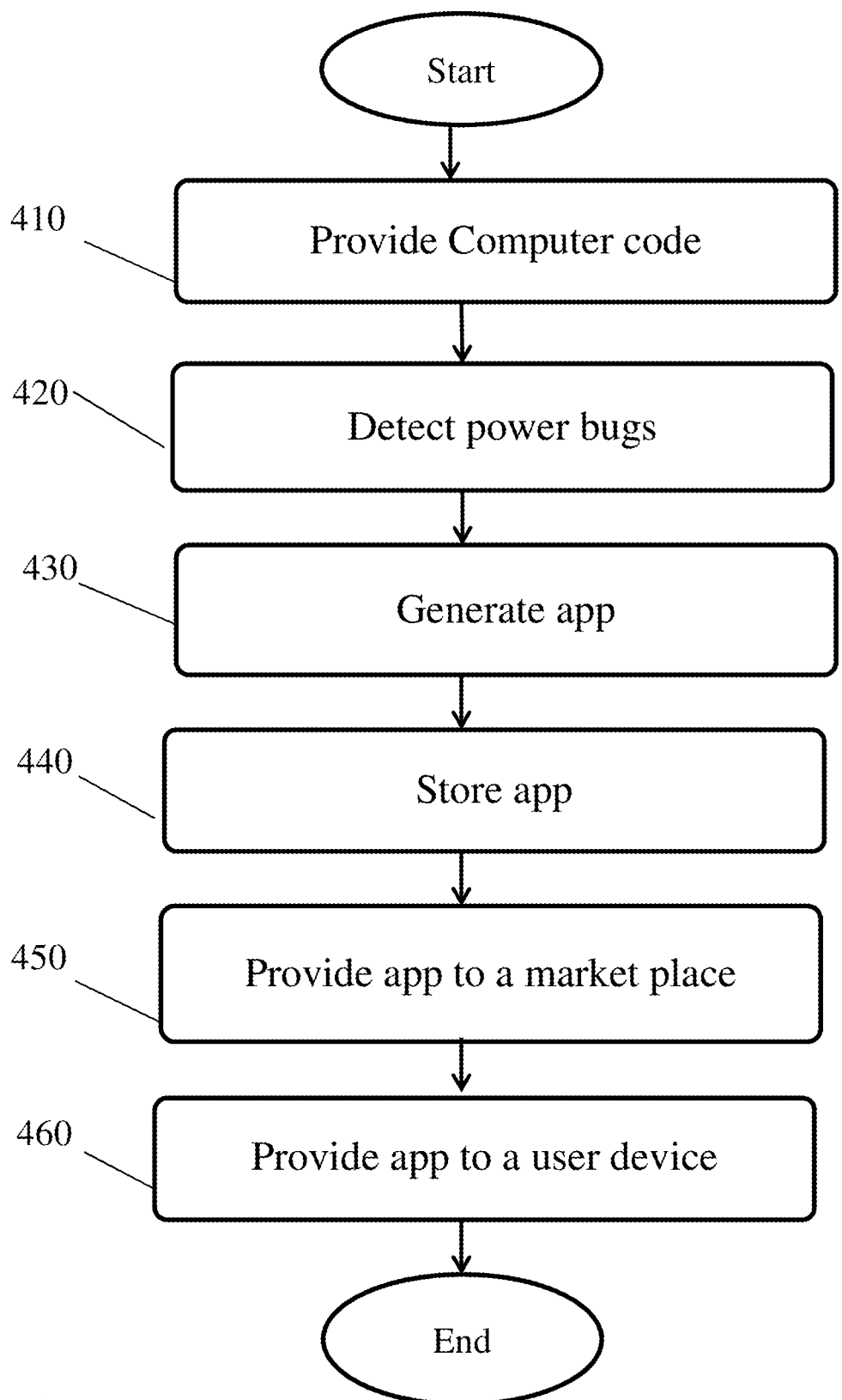
FIG. 7 illustrates a sequence of processes used to generate applications void of power bugs for a device in accordance with an embodiment of the present invention.

FIG. 7 illustrates a sequence of processes used to generate applications void of power bugs for a device in accordance with an embodiment of the present invention.

Referring to FIG. 7, a computer code is provided by the developer of the application (App) (box 410). As described in various embodiments of the present invention, power bugs in the computer code are detected (box 420). Next, the computer code may be cleaned up to remove any detected power bugs. For example, in one or more embodiments, no sleep bugs such as no sleep code paths and no sleep race conditions are detected and removed using reaching definitions dataflow analysis. If no further power bugs are detected, the computer code may be compiled and converted into an App (box 430). This App may be stored in a memory of a server performing the detecting or other servers (box 440). Next, the bug free App is provided at a market place for user consumption (box 450). The bug free App is provided to a user device, which may download the application onto the user device (box 460).

Figure 8:
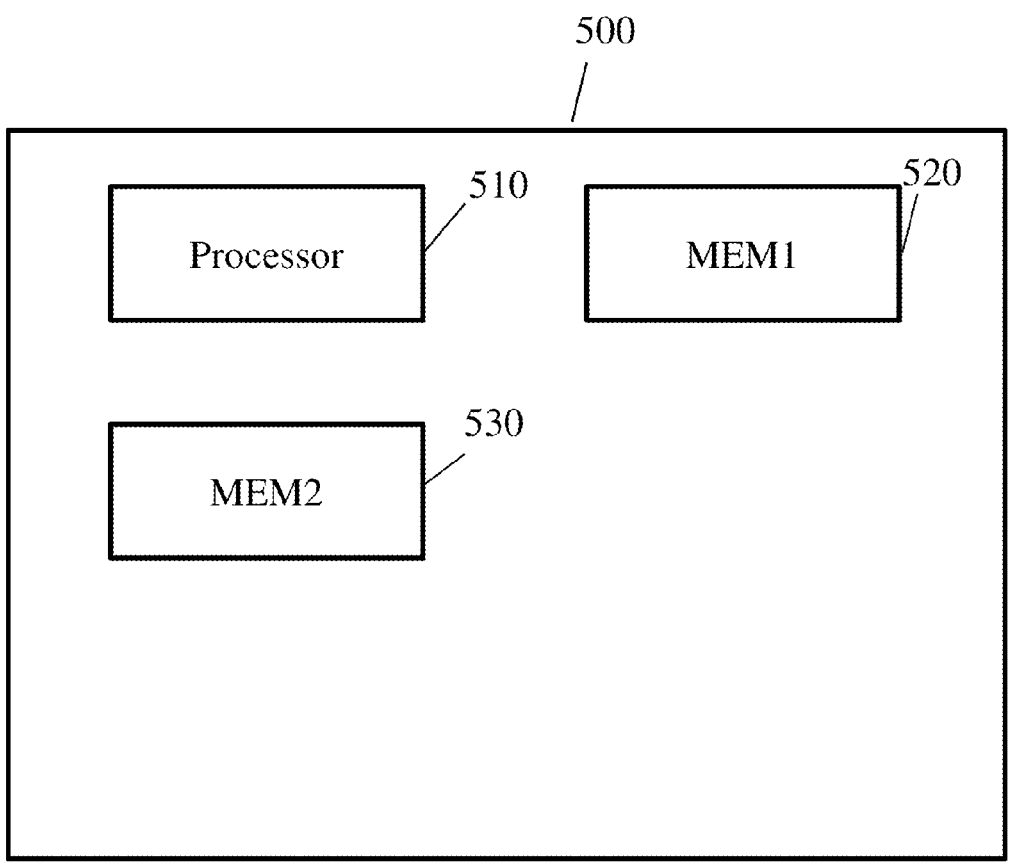
FIG. 8 illustrates a computing device configured to execute a debugging tool in accordance with embodiments of the present invention.

FIG. 8 illustrates a computing device configured to execute a debugging tool in accordance with embodiments of the present invention.

In accordance with an alternative embodiment and referring to FIG. 8, a computing device 500 comprises a processor 510 configured to execute a debugging tool. The computing device 500 comprises a first non-transitory storage medium (MEM1 520) comprising the debugging tool. The debugging tool is configured to generate a control flow graph for at least a portion of a computer code, detect if the control flow graph exits without performing a function call for deactivating power to any component by traversing the control flow graph after performing a function call to activate power, and generate an error message if the control flow graph exits without performing a function call to deactivate power to any component. The computing device 500 comprises a second non-transitory storage medium (MEM2 530). The second non-transitory memory medium (MEM2) is configured to store the error message. In one or more embodiments, the first and the second non-transitory memory mediums (MEM1 and MEM2) may be part of a same memory or may be different memories.

Figure 9:
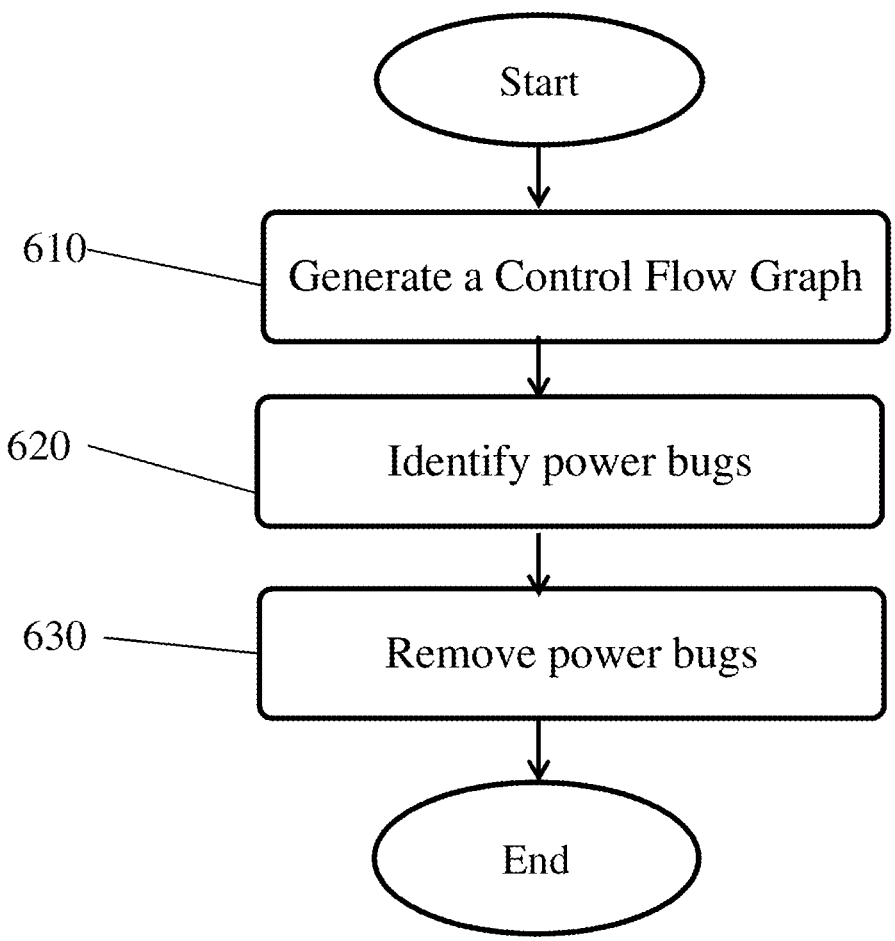
FIG. 9 illustrates a computer-implemented method for analyzing an application comprises computer executable instructions from a computer code in accordance with embodiments of the present invention.

FIG. 9 illustrates a computer-implemented method for analyzing an application comprises computer executable instructions from a computer code in accordance with embodiments of the present invention. The method comprises generating a control flow graph for at least a portion of the computer code at a processor (box 610), identifying power bugs in the computer code by traversing the control flow graph to identify if the control flow graph exits without performing a function call to deactivate power to any component of a device configured to execute the computer executable instructions after performing a function call to activate power (box 620), and removing the power bugs if the control flow graph exits without performing a function call to deactivate power to any component (box 630).

Accordingly, in various embodiments, we developed a general static compiler analysis framework that performs no-sleep energy bug detection by detecting any paths in the Control Flow Graph (CFG) that contain mismatching power control APIs, e.g., acquire, but do not release wakelocks. For single-threaded applications, embodiments of the present invention describe single-thread reaching definitions dataflow analysis (S-RDDA) to detect any paths in the CFG that results in mismatching power control API invocations, e.g., on Android APIs that acquire, but do not release wakelocks. The analysis determines if the "value" of "acquire" equivalent APIs assigned to power control object, e.g., a wakelock on Android, can still be the value of the variable at the end of the event. If so, one or more path exists that may contain a no-sleep bug. For single-threaded applications, the S-RDDA analysis distinguishes the mismatching of different types of power control APIs, e.g. wakelocks on Android. For single-threaded applications, such an S-RDDA analysis further handles normal Java runtime exceptions such as try-catch constructs. For single-threaded applications, our S-RDDA analysis further handles uncaught runtime exceptions by placing edges from each runtime exceptions to the EXIT node for that routine. For single-threaded applications, the S-RDDA analysis for handling uncaught runtime exceptions may be enhanced by integrating with various runtime exception analysis techniques. For single-threaded applications, our S-RDDA analysis further handles event-based multiple entry points to each routine, which are typical in mobile application programming such as in Android.

Embodiments of the present invention may also be applied for multi-threaded applications. For multi-threads applications, where the power control APIs (e.g. wakelocks on Android) can be acquired and released in different threads of an app, embodiments of the present invention describe a multi-thread reaching definitions dataflow analysis (M-RDDA) to detect execution paths that result in power control APIs not being matched, e.g., wakelock not being released on Android, by adapting a variation of reaching definition dataflow analysis previously used for parallel programs. For multi-threaded applications, M-RDDA can handle all of the above complications as described with reference to single-threaded applications. The implementation of our no-sleep bug detection methods S-RDDA and M-RDDA, which convert the no-sleep energy bug detection problem into finding paths in the CFG that lead to mismatching power control APIs, e.g., unreleased wakelocks on Android, may be realized using different algorithms in specific software artifacts, such as any flavors of CFG tree-traversal. In various embodiments, tree traversal may be accomplished using numerous algorithms known in the art.

Although embodiments of the present invention have been described using phrases such as function call to deactivate/activate power, these also are applicable to and include situations where the function calls achieve equivalent or similar effects as deactivating/activating power. For example, as described previously, Android provides wakelock acquire and wakelock release APIs. In such an example, by default the phone is "allowed to go to sleep", i.e., will go to sleep, after a timeout period. Calling the wakelock acquire API prevents the phone from going to sleep which is similar to activing power, while calling the wakelock release API then re-allows the phone to go to sleep, which is similar to deactivating power. The use of the phrases deactivate/activate is intended to include function calls to wakelock acquire (i.e., activate) and wakelock release (i.e., deactivate).

Figure 10:
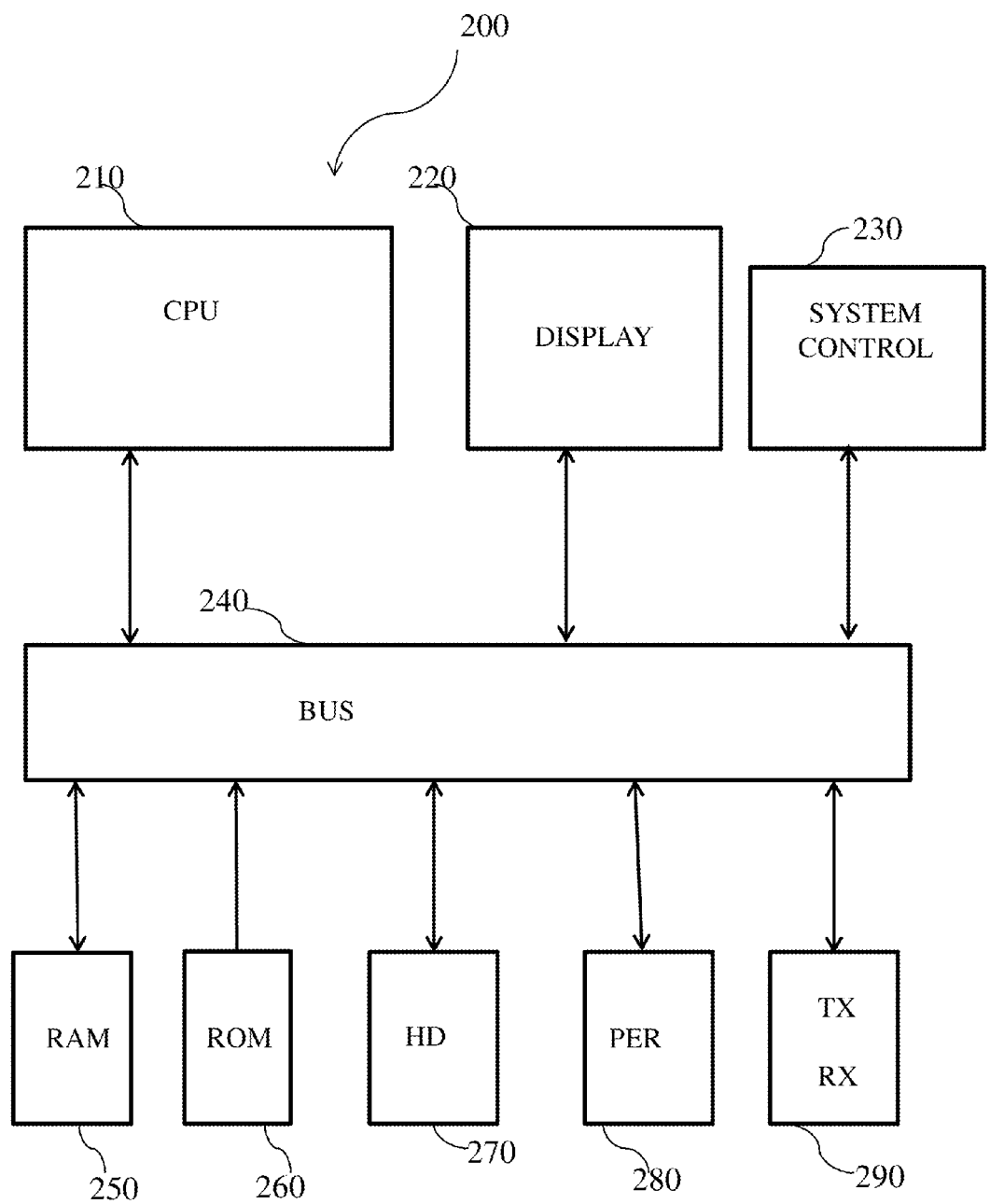
FIG. 10 illustrates a computing system in accordance with an embodiment of the present invention.

FIG. 10 illustrates a computing system in accordance with an embodiment of the present invention.

The system 200 includes a central processing unit (CPU) 210, e.g., a processor, a display 220, which may be optional, a system control unit 230. A plurality of components may be connected to the CPU 210 in various embodiments. For example, a plurality of memory units and/or peripherals may be coupled through the bus 240. In one or more embodiments, a random access memory (RAM) 250, which may be volatile or a non-volatile memory, a read only memory (ROM) 260, a hard drive (HD) 270, which may be a magnetic memory, may be coupled. Additionally, peripheral devices 280 such as keyboard including touch screen keyboards, mouse, sensors including MEMS units may be coupled to the CPU 210. The system may also include input/output devices 290 such as transmitters and receivers. In case, the system 200 is used in a power constrained device, one or more battery is used to power all these devices.

In various embodiments, the computing system 200 described above in various embodiments may also be part of any other type of electronic device including smart phones, tablets, computers, laptops, sensing devices, and others.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for analyzing a computer code, the method comprising:
   at a processor, generating a control flow graph for at least a portion of the computer code; and
   identifying power bugs by traversing the control flow graph to identify if the control flow graph exits without performing a function call to deactivate power to any component of a device configured to execute computer executable instructions based on the computer code after performing a function call to activate power,
   wherein the step of identifying power bugs comprises applying a forward dataflow analysis,
   wherein applying the forward dataflow analysis comprises
      applying a reaching definitions analysis to identify any mismatch in definitions relating to function calls for activating or deactivating power, and
   wherein applying the reaching definitions analysis comprises
      identifying steps in the control flow graph relating to function calls for activating or deactivating power,
      defining a power variable for each step with a function call for activation and for each step with a function call for deactivation that are identified,
      assigning a first binary value to the power variable for each function call for activation and assigning an opposite second binary value to the power variable for each function call for deactivation,
      generating a set of definitions of the power variable reaching an EXIT block of the control flow graph, and
      identifying a power bug if any definition of the first binary value is identified in the set of definitions of the power variable at the EXIT block.

2. The method of claim 1, further comprising generating an error message if the control flow graph exits without performing a function call to deactivate power to any component.

3. The method of claim 2, further comprising storing the error message in a non-transitory memory medium.

4. The method of claim 1, wherein the computer executable instructions are configured to run on a power constrained device.

5. The method of claim 4, wherein the function call to activate power comprises a function call to prevent the power constrained device from going to sleep, and wherein the function call to deactivate power comprises a function call to re-allow the power constrained device to go to sleep.

6. The method of claim 4, further comprising:
   receiving the computer code; and
   removing the identified power bugs.

7. The method of claim 6, further comprising:
   after removing the identified power bugs, generating the computer executable instructions by compiling the computer code if the computer code exits after performing a function call to deactivate power to any component previously activated; and storing the computer executable instructions in a non-transitory memory medium.

8. The method of claim 7, further comprising:
   providing an application comprising the computer executable instructions to a user device at an online market place.

9. The method of claim 1, wherein applying the forward dataflow analysis comprises applying a live variable analysis, or an available expressions analysis.

10. The method of claim 1, wherein the computer code is configured to execute as a single thread process.

11. The method of claim 1, wherein generating the control flow graph comprises:
    generating individual control flow graph for each event handler in the computer code comprising a plurality of event handlers; and
    stitching together the individual control flow graphs.

12. The method of claim 1, wherein computer code is configured to execute as a multi-threaded application.

13. The method of claim 12, wherein generating the control flow graph comprises generating a control flow graph for a multi-threaded application.

14. The method of claim 13, wherein generating the control flow graph comprises:
    generating individual control flow graph for each thread;
    connecting a fork spawning each thread with an ENTRY block of the individual control flow graph for that thread; and connecting an EXIT block of the individual control flow graph for that thread with a join node or with another ENTRY block of another individual control flow graph of another thread.

15. A computing device comprising:
a processor configured to execute a debugging tool, the debugging tool configured to:
generate a control flow graph for at least a portion of a computer code, and
identify power bugs by detecting if the control flow graph exits without performing a function call for deactivating power to any component of a device configured to execute computer executable instructions based on the computer code by traversing the control flow graph after performing a function call to activate power,
wherein the step of identify power bugs comprises apply a forward dataflow analysis,
wherein apply the forward dataflow analysis comprises
apply a reaching definitions analysis to identify any mismatch in definitions relating to function calls for activating or deactivating power, and wherein apply the reaching definitions analysis comprises
identify steps in the control flow graph relating to function calls for activating or deactivating power,
define a power variable for each step with a function call for activation and for each step with a function call for deactivation that are identified,
assign a first binary value to the power variable for each function call for activation and assigning an opposite second binary value to the power variable for each function call for deactivation,
generate a set of definitions of the power variable reaching an EXIT block of the control flow graph, and
identify a power bug if any definition of the first binary value is identified in the set of definitions of the power variable at the EXIT block.

16. A non-transitory storage medium comprising a debugging tool, the debugging tool configured to analyze a computer code by:
generating a control flow graph for at least a portion of the computer code; and
identifying power bugs by detecting if the control flow graph exits without performing a function call for deactivating power to any component of a device configured to execute computer executable instructions based on the computer code by traversing the control flow graph after performing a function call to activate power,
wherein the step of identifying power bugs comprises applying a forward dataflow analysis,
wherein applying the forward dataflow analysis comprises
applying a reaching definitions analysis to identify any mismatch in definitions relating to function calls for activating or deactivating power, and
wherein applying the reaching definitions analysis comprises
identifying steps in the control flow graph relating to function calls for activating or deactivating power,
defining a power variable for each step with a function call for activation and for each step with a function call for deactivation that are identified,
assigning a first binary value to the power variable for each function call for activation and assigning an opposite second binary value to the power variable for each function call for deactivation,
generating a set of definitions of the power variable reaching an EXIT block of the control flow graph, and
identifying a power bug if any definition of the first binary value is identified in the set of definitions of the power variable at the EXIT block.

* * * * *